United States Patent [19]

Culley

[11] Patent Number: 5,109,332
[45] Date of Patent: Apr. 28, 1992

[54] SYSTEM FOR CONTROLLING THE TRANSFERRING OF DIFFERENT WIDTHS OF DATA USING TWO DIFFERENT SETS OF ADDRESS CONTROL AND STATE INFORMATION SIGNALS

[75] Inventor: Paul R. Culley, Cypress, Tex.

[73] Assignee: Compaq Computer Corporation, Houston, Tex.

[21] Appl. No.: 243,327

[22] Filed: Sep. 9, 1988

[51] Int. Cl.$^5$ .................. G06F 13/14; G06F 13/42
[52] U.S. Cl. ............................ 395/325; 364/240.3; 364/254.9; 364/927.93; 364/935.47; 364/940.61; 364/970.3; 364/DIG. 2
[58] Field of Search ... 364/200 MS File, 900 MS File

[56] References Cited

U.S. PATENT DOCUMENTS

| | | | |
|---|---|---|---|
| 4,325,118 | 4/1982 | DeVita et al. | 364/200 |
| 4,361,869 | 11/1982 | Johnson et al. | 364/200 |
| 4,417,303 | 11/1983 | Korowitz et al. | 364/200 |
| 4,467,447 | 8/1984 | Takahashi et al. | 364/900 |
| 4,514,808 | 4/1985 | Murayama et al. | 364/200 |
| 4,667,305 | 5/1987 | Dill et al. | 364/900 |
| 4,683,534 | 7/1987 | Tietjen et al. | 364/200 |

OTHER PUBLICATIONS

H. Jessup, "PCET 32-Bit Bus Specification", PCET Bus Development Committee, pp. 2-18, Jun. 9, 1986.
IBM Personal Computer AT Technical Reference Manual, 1985, pp. 1-24 to 1-38.
IBM RT PC Hardware Technical Reference Manual, vol. 1, Second Edition, Sep. 1986, pp. 6-1 to 6-62.
IEEE P1196 Specification, Draft 2.0, NuBus, Dec. 15, 1986, pp. 1-60.
IBM Personal System/2 Model 80 Technical Reference, First Edition, Apr. 1987, pp. 2-1 to 2-28 and 2-75 to 2-113.
H. Jessup, PCET 32-Bit Bus Specification, PCET Bus Development Committee, Jun. 9, 1986.
M. Vano, Personal Computer Extended Technology Bus Committee Alternate Bus Master Data Multiplexing Draft Subcommittee Report, Jun. 14, 1986.
M. Vano, Ambiguities in the IBM PC/RT and PC/AT Documentation (Re: Alternate Bus Masters), Jun. 15, 1986.

Primary Examiner—Thomas C. Lee
Assistant Examiner—Ayni Mohamed
Attorney, Agent, or Firm—Pravel, Gambrell, Hewitt, Kimball & Krieger

[57] ABSTRACT

A computer system which utilizes two different sets of address control and state information signals for transferring data of different widths is disclosed. The use of two sets of signals allows master units to utilize only one set and a system board determines when the second set of signals must be used to complete the transfer and controls the second set of signals as necessary. The system board provides the necessary data routing and latching to properly transfer the data.

18 Claims, 13 Drawing Sheets

SYSTEM FOR CONTROLLING THE TRANSFERRING OF DIFFERENT WIDTHS OF DATA USING TWO DIFFERENT SETS OF ADDRESS CONTROL AND STATE INFORMATION SIGNALS

BACKGROUND OF THE INVENTION

1. Field of the Invention

The present invention relates to interface standards used within computer systems, and more particularly to interfaces or busses handling multiple word sizes and having the capability of having multiple bus controllers.

2. Description of the Prior Art

Microprocessors and the personal computers which utilize them have been becoming more powerful over the recent few years. Currently available personal computers have capabilities easily exceeding the mainframe computers of twenty to thirty years ago and approach the capabilities of minicomputers currently manufactured. Microprocessors having word sizes of 32 bits wide are now available, whereas in the past eight bits was conventional and sixteen bits was common.

Personal computer systems have developed over the years and new uses are being discovered daily. The uses are varied and, as a result, have different requirements for the various subsystems forming a complete computer system. Because of production volume requirements and the reduced costs as volumes increase, it is desirable that as many common features as possible are combined into high volume units. This has happened in the personal computer area by developing a basic system unit which generally contains a power supply, provisions for physically mounting various mass storage devices and a system board, which in turn incorporates a microprocessor, microprocessor related circuitry, connectors for receiving circuit boards containing other subsystems, circuitry related to interfacing the circuit boards to the microprocessor, and memory. The use of connectors and interchangeable circuit boards allows subsystems of the desired capability for each computer system to be easily incorporated into the computer system.

The use of interchangeable circuit boards necessitated the development of an interface or bus standard so that the subsystems could be easily designed and problems would not result from incompatible decisions by the system unit designers and the interchangeable circuit board designers.

The use of interchangeable circuit boards and an interface standard, commonly called a bus specification because the various signals are provided to all the connectors over a bus, was incorporated into the original International Business Machines Corporation (IBM) personal computer, the IBM PC. The IBM PC utilized an Intel Corporation 8088 as the microprocessor. The 8088 has an eight bit, or one byte, external data interface but operates on a 16 bit word internally. The 8088 has 20 address lines, which means that it can directly address a maximum of 1 Mbyte of memory. In addition, the memory components available for incorporation in the original IBM PC were relatively slow and expensive as compared to current components. The various subsystems, such as video output units or mass storage units, were not complex and also had relatively low performance levels because of the relative simplicity of the devices available at a reasonable cost at that time.

With these various factors and the component choices made in mind, an interface standard was developed and used in the IBM PC. The standard utilized 20 address lines and eight data lines, had individual lines to indicate input or output (I/O) space or memory space read or write operations, and had limited availability of interrupts and direct memory access (DMA) channels. The complexity of the available components did not require greater flexibility or capabilities of the interface standard to allow the necessary operations to occur. This interface standard was satisfactory for a number of years.

As is inevitable in the computer and electronics industry, capabilities of the various components available increased dramatically. Memory component prices dropped and capacities and speeds increased. Performance rates and capacities of the mass storage subsystems increased, generally by the incorporation of fixed disk units for the previous floppy disk units. The video processor technology improved so that high resolution color systems were reasonably affordable. These developments all pushed the capabilities of the existing IBM PC interface standard so that the numerous limitations in the interface standard became a problem. With the introduction by Intel Corporation of the 80286 microprocessor, IBM developed a new, more powerful personal computer called the AT. The 80286 has a 16 bit data path and 24 address lines so that it can directly address 16 Mbytes of memory. In addition, the 80286 has an increased speed of operation and can easily perform many operations which were previously very complicated with the 8088.

It was desired that the existing subsystem circuit boards be capable of being used in the new AT, so the interface standard used in the PC was utilized and extended. A new interface standard was developed, which has become known as the Industry Standard Architecture ISA). A second connector for each location was added to contain additional lines for the signals used in the extension. These lines included additional address and data lines to allow the use of the 24 bit addressing capability and 16 bit data transfers, additional interrupt and direct memory access lines and lines to indicate whether the subsystem circuit board was capable of using the extended features. While the address values are presented by the 80286 microprocessor relatively early in an operation cycle, the PC interface standard could not utilize the initial portions of the address availability because of different timing standards for the 8088 around which the PC interface standard was designed. This limited the speed at which operations could occur because they were now limited to the interface standard memory timing specifications and could not operate at the rates available with the 80286. Therefore the newly added address lines included address signals previously available, but the newly added signals were available at an earlier time in a cycle. This change in address signal timing allowed operations which utilized the extended portions of the architecture to operate faster.

With the higher performance components available, it became possible to have a master unit other than the system microprocessor or direct memory access controller operating the bus. However, because of the need to cooperate with circuit boards which operated under the new sixteen bit standard or the old eight bit standard, each master unit was required to understand and operate with all the possible combinations of circuit boards. This increased the complexity of the master unit and resulted in a duplication of components, because the master unit had to incorporate many of the functions and features already performed by the logic and circuitry on the system board and on other master units. Additionally, the master unit was required to utilize the direct memory access controller to gain control of the bus, limiting prioritizing and the number of master units possible in a given computer system.

The capability of components continued to increase. Memory speeds and sizes increased, mass storage unit speeds and sizes increased, video unit resolutions increased and Intel Corporation introduced the 80386 microprocessor. The increased capabilities of the components created a desire for more use of master units, but the performance of a master unit was limited by the ISA specification and capabilities. The 80386 could not be fully utilized because it offered the capability to directly address 4 Gbytes of memory using 32 bits of address and could perform 32 bit wide data transfers, while the ISA standard allowed only 16 bits of data and 24 bits of address.

An extension similar to that performed in developing the ISA could be done to fully utilize the 80386's capabilities but this extension would have certain disadvantages. If it was desired to use any of the previously existing subsystem circuit boards, to prevent the need to replace at great cost the boards, the complexity of the interface standard increased greatly, so that the amount of redundant circuitry in a master unit would become oppressive, both in terms of component cost and space requirement. Additionally, a similar extension would not increase mastering capabilities significantly, but would still limit their operation because of difficulties in obtaining and controlling the bus which existed in the ISA.

SUMMARY OF THE INVENTION

A computer system incorporating the present invention can utilize the capabilities of the present computer components, can utilize master units which do not have redundant circuitry and can utilize the vast majority of subsystem circuit boards designed to operate according to the IBM PC standard and to the ISA standard. A computer system incorporating the present invention provides the increased address and data lines necessary to allow use of the full memory address range and 32 bit word width of the Intel Corporation 80386. New state indication and address control signals are provided on a new connector. The new signals are for use by units capable of operating on 32 bit wide data and address buses and by new master units. The state indication and address control signals of the ISA standard are still utilized for operation with circuit boards that do not support the new 32 bit extended architecture and specifications.

By providing two sets of state indication and memory control signals, it is now possible to design master units which are not required to understand and operate with all the possible interface alternatives. Instead, the master unit need only utilize the 32 bit extended state indication and address control signals and the appropriate address and data signals. According to this invention, the system board monitors the bus operations of a master unit and determines when the requested operation cannot be performed by a circuit board capable of responding using the 32 bit extended features. When this condition occurs, the system board indicates to the master unit that the requested operation is not ready and the master unit releases the data lines for control by the system board. The system board proceeds to perform the operation utilizing the necessary eight or sixteen bit protocol based on ISA standard signals. After the operation is completed and all the data is obtained or written, the system board moves the data to the correct byte location in the 32 bit word, if appropriate, and indicates to the master unit that the requested operation is ready. The cycle is completed using the new 32 bit extended protocol.

In this manner the master unit need not be capable of independently operating with ISA standard-only circuit boards, but uses the system board to provide the capability to utilize ISA standard-only circuit boards. Thus large amounts of circuitry need not be on each master unit when using the present invention, thereby saving duplication of circuitry on each master unit with the resulting cost and circuit board area savings.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

The following disclosures are hereby incorporated by reference:

U.S. application Ser. No. 243,380, entitled "Computer System with High Speed Data Transfer Capabilities" by Paul R. Culley, filed on Sep. 9, 1988;

U.S. application Ser. No. 242,728, entitled "Extended Input/Output Circuit Board Addressing System" by Paul R. Culley and Montgomery McGraw, filed on Sep. 9, 1988, issued as U.S. Pat. No. 4,999,805 on Mar. 12, 1991;

U.S. application Ser. No. 242,954, entitled "Programmable Interrupt Controller" by Paul R. Culley, and Montgomery McGraw, Karl N. Walker and Lazaro D. Perez, filed on Sep. 9, 1988, now abandoned and continued as U.S. application Ser. No. 691,169, filed on Apr. 24, 1991; and U.S. application Ser. No. 242,734, entitled "Method and Apparatus for Configuration of Computer System and Circuit Boards" by Curtis R. Jones, Jr., Robert S.

Gready, Roberta A. Walton, Scott C. Farrand, Pamela H. Williams; Beatrice Dee Pipes; Montgomery McGraw; Darryl George; and Michael Griffin, filed on Sep. 9, 1988, all of which are assigned to the assignee of this invention.

Figure 1:
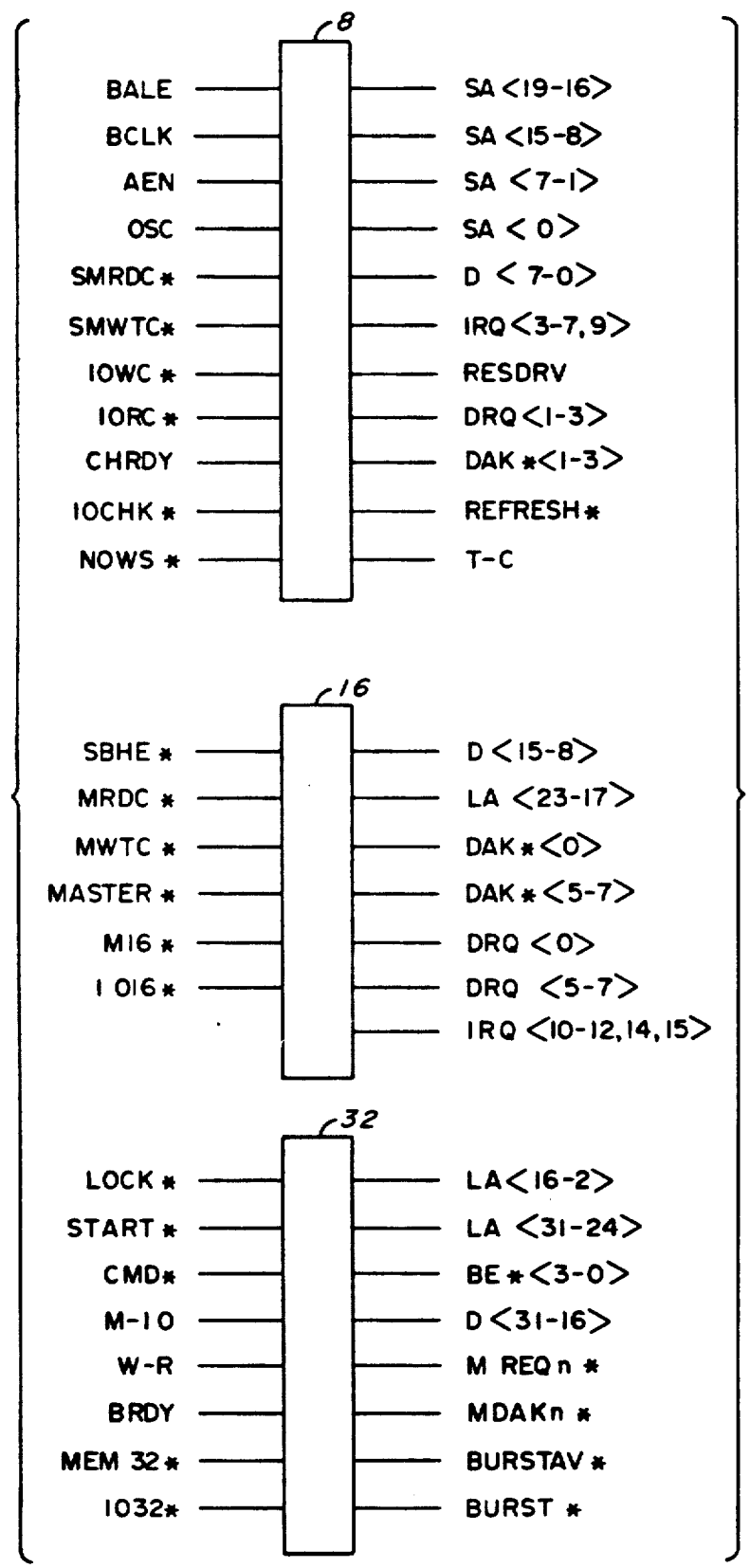
FIG. 1 is a diagram illustrating the connectors and signals of a computer system incorporating the present invention.

A computer system incorporating the present invention has a system board which has a number of locations or slots for inclusion of interchangeable circuit boards. Each location has at least one connector, the 8 bit IBM PC standard connector referred to by the numeral 8 (FIG. 1). If the location is an ISA standard location, it has an additional sixteen bit extension connector 16. Finally, each location which incorporates the present invention has a third connector, a 32 bit connector 32. Each connector 8, 16 or 32 has included a series of lines which are designated for carrying various signals, which are the logical representation of the desired function and generally have the same identification mnemonic. The signals associated with the 8, 16 and 32 bit connectors 8, 16 and 32 are shown with the respective connectors in FIG. 1. The various power and ground lines included in each connector are not shown for reasons of clarity. The various lines are connected to each connector 8, 16 and 32 at each location, so that a bus results. This is the bus which is generally referred to in this specification. In general when referring to signals in this description, an asterisk (*) after a signal mnemonic indicates that it is logically true when a low voltage level is present and angle brackets with included numbers after a signal mnemonic are used to indicate single or multiple bit positions in a wider logical signal, such as the data or address fields.

Various mnemonics are assigned to the signals and each of the signals has a given logical meaning. The logical meanings of various signals illustrated in FIG. 1 will be explained at this time. The SA<19-16>, SA<15-8>, SA<7-1> and SA<0> signals are the 20 bits of address information originally provided in the IBM PC. Generally, the new addressing information is enabled onto these lines when the valid address signal BALE, for address latch enable, is high. The addressing information present on the SA lines is latched by the system board when the BALE signal goes from a high to a low state. These SA address lines are provided in addition to the address lines LA<23-17>, LA<16-2>, and LA<31-24> which are for use with the pipelined address values presented by the system microprocessor if it is an 80286 or 80386. The addressing information is available on the LA lines for a period of time before the information is available on the SA lines, thereby allowing faster operation of the various circuit boards which utilize these lines and signals. It is to be noted that the signals LA<16-2> and LA<31-24> are available only on the 32 bit connector 32. Four additional addressing signals, which are referred to as the byte enable signals BE*<3-0> are also present on the 32 bit connector 32. These signals are provided by the 80386 to indicate which byte or bytes of the 32 bit double-word is desired.

The 32 data lines present in the computer system are the signals or lines referred to as D<7-0> on the 8 bit connector 8, D<15-8> available on the 16 bit connector 16, and D<31-16> present on the 32 bit connector 32. Thus a circuit board utilizing all 32 bits of data available when using the new 32 bit extension standard must connect the various bytes of information to the various connectors 8, 16 and 32.

Numerous interrupt request lines were present on the 8 and 16 bit connectors 8 and 16 to allow the various circuit boards to present interrupts to the system board when necessary. These interrupt signals are identified as IRQ<3-7, 9>, and IRQ<10-12, 14, 15> on the 8 and 16 bit connectors 8 and 16.

The computer system can perform direct memory access (DMA) functions wherein information is transferred directly from an I/O space location contained on a circuit board to a memory space location contained on another circuit board or on the system board. Lines must be available to allow signals to indicate when information is available for transfer, so that control of the bus can be transferred to the DMA controller. Additionally, lines must be available to allow a signal to indicate when a DMA request is acknowledged. The DMA request signals DRQ<1-3> and DRQ<0> and DRQ<5-7> are supplied on the similarly identified lines to present the DMA requests. The acknowledgements of the various requests, which are granted to indicate that the specific requesting device may operate, are identified as the DAK*<1-3>, DAK*<0>, and DAK*<5-7> signals and lines. A T-C line is provided on the 8 bit connector 8 to allow indication that the terminal count or last count of a DMA operation has been reached.

In the ISA standard, a master unit had to issue a DMA request to obtain control of the bus. The master unit then awaited for the acknowledgment signal, at which time the master unit took the MASTER* signal low, indicating that a master unit was controlling the bus. The presence of this signal disabled any devices or circuitry which would otherwise normally be presenting address and control information on the bus, such as the DMA controller. Because this circuitry was cumbersome and did not allow sufficient prioritizing and control scheduling, master unit request and master unit request acknowledgment signals are provided in the 32 bit connector 32. These signals are referred to as MREQn* and MDAKn*, where the "n" refers to the specific location or slot of the connector. The addition of these signals provides a manner of changing and adding flexibility to the prioritization of master unit requests and allows the DMA channels to be reserved for more conventional direct memory access type operations.

Because of the costs of various types of memory, personal computer systems generally utilize dynamic random access memory for the main memory systems. Dynamic random access memory (DRAM) is generally available at a significantly lower cost per bit than static random access memory and therefore has allowed the development of the personal computers having very large amounts of memory. However, the DRAM's electrical charge must be periodically refreshed or they will lose the stored information. To facilitate this refreshing operation, a REFRESH* signal is present on the 8 bit connector 8 to indicate that the refresh operation is occurring. The presence of this signal indicates that the various address lines and control signals are operating in the refresh mode to allow the refreshing of the entire system memory at one time.

A reset signal is provided on the 8 bit connector 8 and is referred to as RESDRV. The presence of this signal allows the various circuit boards to be reset during power-up operations.

Because computers generally operate in a synchronized relationship where events must occur in relationship to a controlling signal, a synchronizing clock is generally necessary and is provided in this case by the BCLK signal provided on the 8 bit connector 8. For purposes of this description, the BCLK signal has a frequency between 6.0 MHz and 8.333 MHz, with a nominal value of 8.0 MHz, and has a nominal duty cycle of 50%. This synchronizing signal is different than the OSC signal, which is provided for timing applications and has a frequency of 14.31818 MHz and a duty cycle of approximately 50%. The OSC signal is not synchronized, but is provided for general clocking features, whereas the BCLK signal is synchronized to the microprocessor's system clock and is used as the reference for interface signal timing requirements.

A signal referred to as the AEN signal is provided on the 8 bit connector 8 to indicate to the circuit boards that the DMA controller is in control of the bus. One of the functions of this signal is to indicate to an I/O device that it must not respond to the other signals being presented on the bus. However, the AEN signal is not used by a circuit board when that board must respond to a DMA operation. This DMA response need is determined by coordinating the DMA acknowledged signal DAK* with the AEN signal, so that if the circuit board's DAK* signal is high, indicating that it is not being accessed, then when the AEN signal is high any addressing information is not utilized.

An IOCHK* line is provided on the 8 bit connector 8 to signal the system about parity or other serious errors which have occurred on the circuit boards plugged into the various connectors. This signal is used when an uncorrectable error occurs so that further processing is not performed on any erroneous data.

On the 32 bit connector 32 a new line referred to as LOCK* is provided for interaction with circuit boards which contain local memory and local processing capability. The information stored in the local memory may be changed by the local processor at the same time that the local memory information is being requested by the device controlling the bus, thus resulting in the bus device receiving incorrect information. When the LOCK* signal is asserted low, the local processing devices cannot access the local memory, to prevent data values from changing between accesses by the device controlling the bus.

The remaining signals provided on the three connectors 8, 16 and 32 are state indication and address control signals. The signals are used to indicate the operating state of the bus or the need for accessing to the various I/O or memory spaces. In general, the state indication and address control signals of the 8 and 16 bit connectors 8 and 16 are such that individual signals are presented to indicate whether a memory or I/O space operation read or write is being performed. For example, the MRDC* or SMRDC* signals are made active during a memory read cycle. The SMRDC* signals are enabled only when a memory read operation within the first 1 Mbyte of memory is occurring. In a similar manner, the MWTC* and SMWTC* signals are used to indicate a memory write operation, while the IORC* and IOWC* signals are used to indicate I/O space read and write operations, respectively. Because the various I/O devices and memory devices have differing speeds, it is necessary for the bus controller to know whether a particular device can respond faster than a given norma rate or slower than a given normal rate. For this reason, a signal referred to as NOWS* is provided to indicate that no further wait states are necessary when addressing that particular device, and a CHRDY signal is provided to indicate that the particular device is not ready at that time.

A signal referred to as SBHE* is provided on the 16 bit connector 16 to indicate that the D<15-8> lines will be used in the data transfer. Two additional address control signals, referred to as M16* and IO16*, are provided on the 16 bit connector 16 to indicate that a 16 bit device will respond to the information request or cycle present on the bus. The M16* signal is developed from the use of the LA address signals and thus is presented early in a given cycle. The presence of either the IO16* or M16* signal indicates both that the device will respond using the 8 and 16 bit connectors 8 and 16, and that the device can respond to a shorter standard cycle time than a device which is attached to only the 8 bit connector 8. This shorter standard cycle time is possible because of the various improvements in component speeds which occurred between the development of the IBM PC standard and the ISA standard. These state indication and address control signals represent the state indication and address control signals necessary for operation under the ISA standard and for operation with 8 and 16 bit wide data. These signals are utilized by existing 8 and 16 bit circuit boards designed for operation with the IBM PC or ISA standards.

A wholly separate set of state indication and address control signals is provided for the 32 bit extended standard. The START* and CMD* signals are provided for timing control in a 32 bit cycle. The START* signal is asserted after the address has become valid and is generally deactivated after one full BCLK cycle time. The START* signal thus indicates the start of a 32 bit cycle. The rising edge of the START* signal can be used to latch the address if desired. The CMD* signal is asserted low when the START* signal is deactivated and is continued at a low state until the end of the cycle. Thus the START* and CMD* signals are used to indicate the beginning and end of a 32 bit extended standard cycle, with various events happening in synchronization with the BCLK signal after the assertion of the START* or CMD* signals. M-IO and W-R signals are used to indicate whether a memory or I/O space cycle is being performed and whether the operation is a read or write operation in that given space. These two signals are used in contrast to the six signals provided in the ISA standard to indicate similar information. A separate line used to indicate that the device or data is not ready is provided on the 32 bit connector 32 and is referred to as the RDY32 line. It is also necessary to know whether the addressed device will respond according to the 32 bit extended standard and this is determined by signals presented on the MEM32* or IO32* lines. These signals have similar meaning to the M16* and IO16* signals, but are also used to indicate whether an operation can be completed wholly using the 32 bit extended standard or must be completed using the ISA standard. Finally, two additional signals referred to as BURST* and BURSTAV* are provided on the 32 bit connector 32. These signals are used to indicate that a memory burst operation is being requested and may occur, to allow very high throughput for certain operations. The operation of these signals is more fully described in a co-pending patent application entitled "Computer System with High Speed Data Transfer Capabilities" which has been incorporated by reference. Thus it can be seen that there is a wholly separate set of state indication and address control signals provided on the 32 bit connector 32. The advantage of this will be seen as more detail is provided on the operation of these various signals, particularly in regards to their capability to operate with a master unit.

The proceeding is a summary of the various lines and signals which are present on the 8, 16 and 32 bit connectors 8, 16 and 32. Operation of the various signals necessary to perform read and write operations by a master unit to various bit width devices will now be explained in detail. The various events which occur will be explained in relation to both rising and falling edges of the BCLK signal as this is the synchronizing signal for the control sequences. For purposes of this description, the computer system's central processing unit, preferably an 80386 microprocessor located on the system board, or the computer system's DMA controller may be considered special master units. In general, equivalents to the signals used by a master unit located on a circuit board for interfacing presented on the 8, 16 and 32 bit connectors 8, 16 and 32 are presented to the central processing unit and the DMA controller, so that while the central processing unit and the DMA controller are not necessarily located on an interchangeable circuit board, they and their related interface circuitry function in a manner similar to such a master unit and thus can be considered a master unit for his description.

Figure 2:
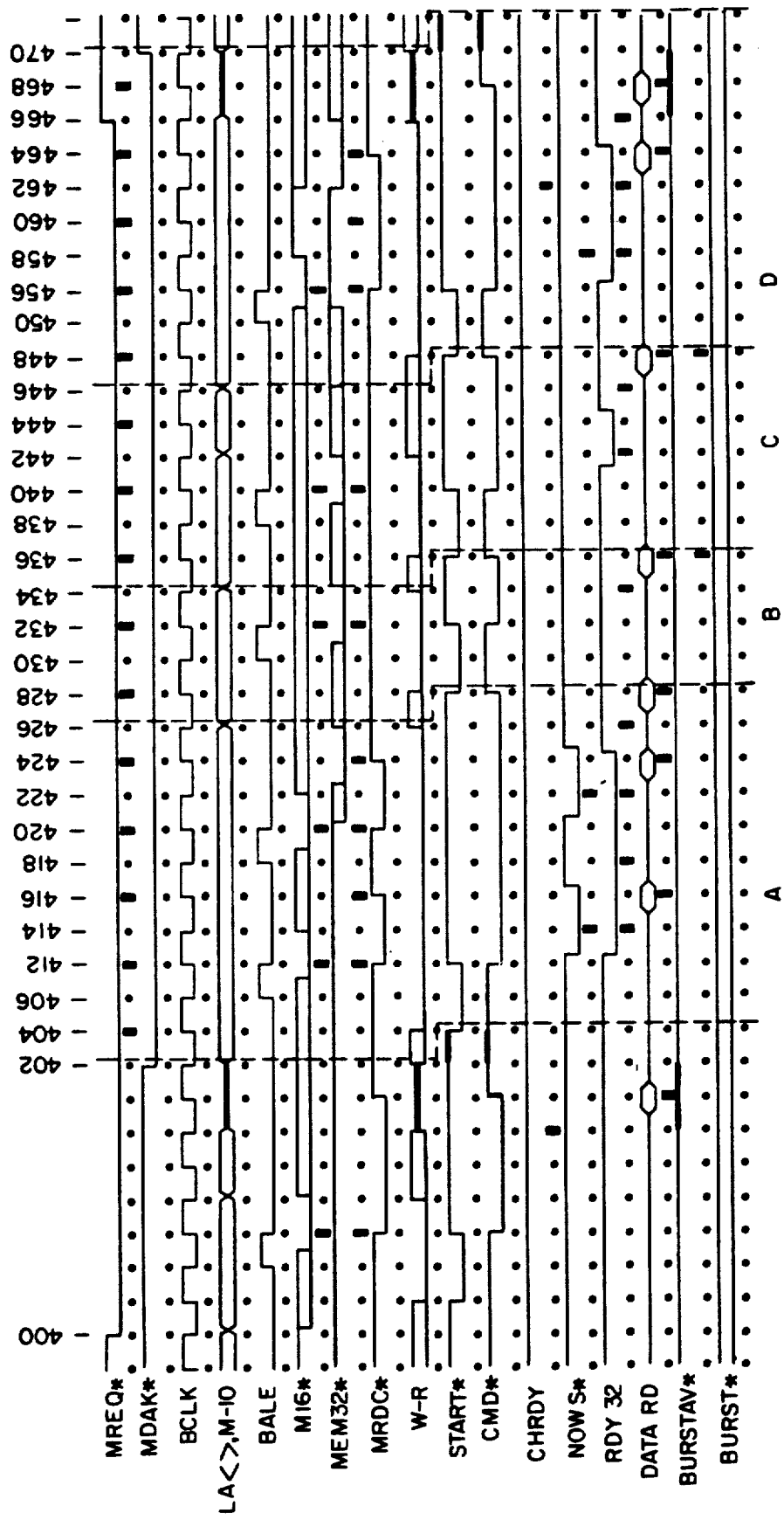
FIGS. 2-5 are timing diagrams showing the waveforms of various portions of a computer system incorporating the present invention.

The master unit which desires control of the bus asserts the MREQn* signal at time 400 (FIG. 2. The priority control logic contained on the system board (not shown) then analyzes this master request and places the request in he priority schedule. Control eventually proceeds to the requesting master unit. The master unit receives control when MDAKn* signal goes low at time 402. The MDAKn* signal is synchronized by the system board so that it goes low on the falling edge of BCLK signal. At this time 402, the master unit presents the 32 bit address onto the LA<31-2> lines and sets the M-IO signal to the proper level. The master unit may at that time also set the W-R signal to indicate the desired read or write operation is desired, but the W-R signal need not be set at this time. At time 404, the BCLK signal goes high. Based on this rising edge, the W-R signal must be asserted, the BE*<3-0> signals are asserted and the START. signal is made active, indicating the beginning of a 32 bit cycle. The dashed line which appears at times 402 and 404 indicates the beginning of a 32 bit cycle. The dashed lines are not straight because address information and certain address control signals appear one-half BCLK signal cycle before the remaining information to allow extra time for address decoding. Time 402 is the beginning of cycle A. which is a request from a 32 bit master unit to read a given memory location, which in cycle A is a memory location which exists on a 16 bit circuit board which uses the 8 and 16 bit bus connectors and cannot respond on the 32 bit bus 32.

At time 406, the next falling edge of the BCLK signal, the BALE signal is asserted by the system board to indicate to all devices which utilize the ISA standard that an address is present. The master unit only presents address information on the LA and BE* lines. The system board transfers the address information to the SA lines as and when appropriate to relieve the master unit of this task.

At the next rising edge of the BCLK signal, which is time 412, he START* command is made inactive and the CMD signal is made active. Additionally, the MEM32* and M16* signals are interrogated to determine if a circuit board capable of responding on the 32 bit lines or the 16 bit lines is present. In the example shown in cycle A, the MEM32* signal remains high and the M16* signal goes low, indicating that a device will not respond on the 32 bit lines but will respond on the 16 bit lines. Because the MEM32* signal is high, the system board will have to complete the cycle and therefore the RDY32 signal is brought to a low condition before the next edge of the BCLK signal. Because the MEM32* is high at this time, the master unit knows that a 32 bit device will not respond and that the system board will be performing a data assembly cycle. The master unit acknowledges this procedure by floating the data lines if a write operation is occurring, so that the system board can utilize the data lines as necessary to properly communicate with the circuit boards which will respond At time 412, the BALE signal is made inactive or low causing the system board to latch address information which appears on the SA address lines. Additionally, the MRDC* line (and the SMRDC* line if appropriate) is brought low at this time to indicate that a memory read operation is occurring. This begins a read cycle according to the ISA standard.

On the next falling edge of the BCLK signal, time 414, the master unit checks the RDY32 signal to determine whether the device being addressed is ready. In this case, it is not ready because the system board has made the RDY32 line low prior to commencing a data assembly cycle. Before the falling edge of the BCLK signal which occurs at time 414, the NOWS* signal must be made low by the responding device to indicate that this is a 16 bit device which is capable of responding in less than the 1 wait state which is built into the standard cycle times for a 16 bit device in the ISA standard specification. In the example in cycle A, the NOWS* signal does go low before time 414. Sometime after time 414 the data coming from the device which is responding will begin correctly appearing on the data lines, in this case D<15-8> on the 16 bit connector 16 and D<7-0> on the 8 bit connector 8. The information must be available and stable prior to the next edge of the BCLK signal at the time 416. Because this has been determined to be a no wait state cycle, at the rising of the BCLK signal at time 416, the MRDC* signal (and SMRDC* signal if appropriate) is made high by the system board indicating the end of a memory read cycle according to the ISA standard and the data which is present on the data lines is forwarded to a latch or other storage device which exists on the system board. The data is automatically routed from the data lines on which it appears to a latch whose outputs are connected the proper byte or word for presentation on the full 32 bit data lines to respond to the request which is still pending on the master unit, because the master unit is waiting for the RDY32 signal to go high indicating the device is ready. This routing is accomplished by means of analyzing the actual address which has been asserted by the system board and the word width which is being responded to by the responding device and requesting data width and locations.

Figure 10:
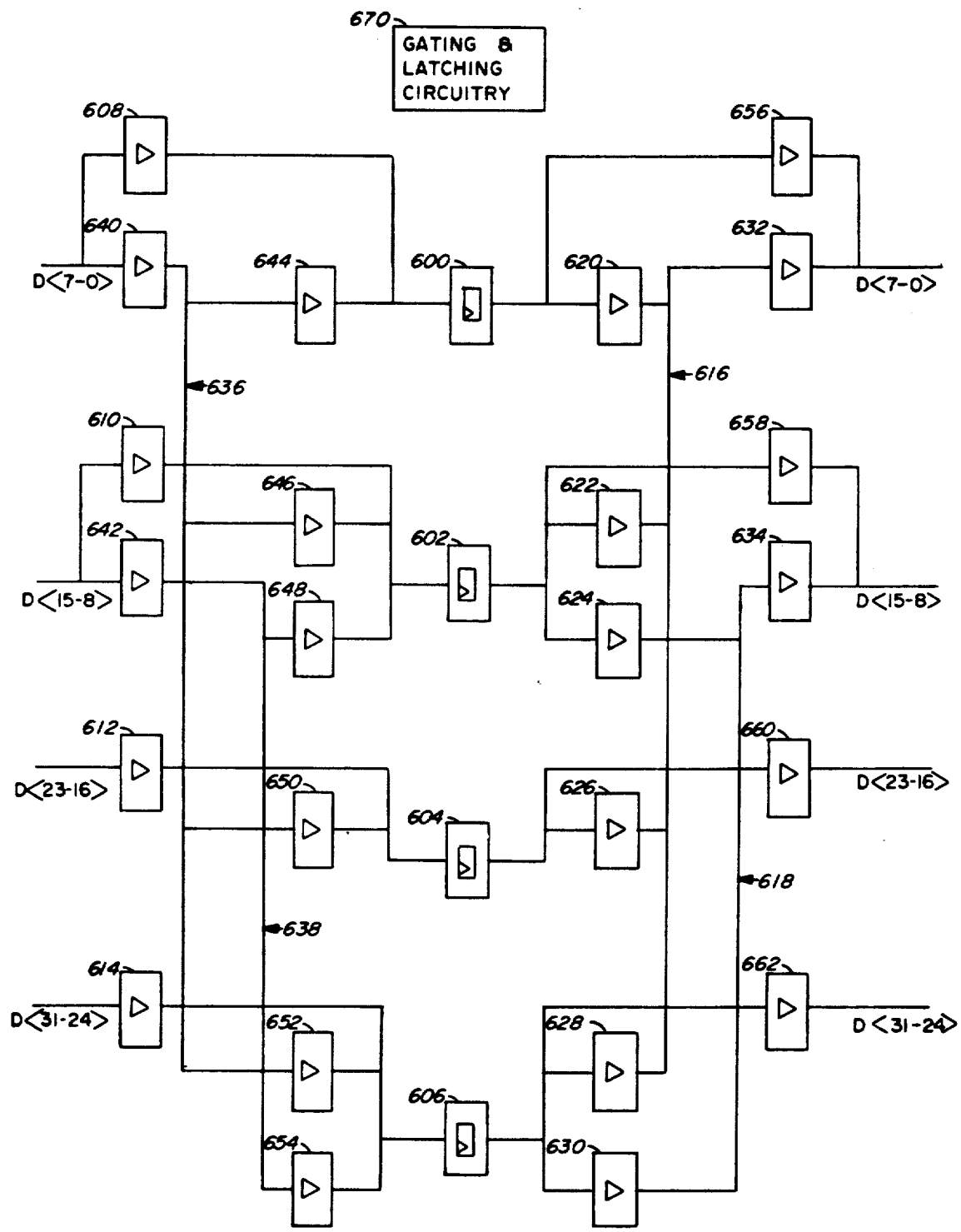
FIG. 10 is a block diagram of data routing and latching circuitry of a computer system incorporating the present invention.

FIG. 10 illustrates a series of buffers and latches connected and controlled to perform this data routing and latching. Four 8 bit latches 600-606 are used to provide the necessary temporary data storage function during the assembly or forwarding process. During a 32 bit write operation the data presented on the D<31-0> lines is transferred to the latches 600-606 by means of four 8 bit buffers 608-614 connected between the D<31-0> lines and the input to the latches 600-606. The data in the latches 600-606 is then presented to an output low byte bus 616 or an output high byte bus 618 through buffers 620-630 as appropriate. For example, when the data is written out in one byte increments, the buffers 620, 622, 626 and 628 are sequentially activated to transfer the information to the D<7-0> lines through an output buffer 632. If the data is written out in two one word increments, buffers 620 and 624 and buffers 626 and 630 are sequentially activated in pairs to transfer the data to the D<15-8> lines and D<7-0> lines through buffers 634 and 632.

During a 32 bit read operation, the data is similarly presented onto an input low byte bus 636 and an input high byte bus 638 through a pair of buffers 640 and 642 as appropriate. The data is presented to the latches 600-606 by controlling a series of buffers 644-654 connected to the input low and high byte buses 636 and 638 and the inputs of the latches 600-606. For example, if a 32 bit read is performed in four one byte increments, buffers 644, 646, 650 and 654 are sequentially operated to transfer data from the D<7-0> line buffer 640 to the latches 600-606. If the operation is performed in two one word increments, buffers 644 and 648 and buffers 650 and 654 are sequentially activated in pairs to transfer the data from the D<15-8> lines and the D<7-0> lines through buffers 640 and 642 to latches 600 and 602 and latches 604 and 606. The read operation is completed by transferring the data from the latches 600-606 through four buffers 656-662 to the D<31-0> lines.

The gating and latching circuitry 670 develops the necessary latching and routing control signals for presentation to the buffers and latches based on the device responding, the number and location of bytes requested to be transferred, and the number of bytes already transferred. The various connections between the buffers and latches and the gating and latching circuitry 670 is not shown for reasons of clarity.

In the case of cycle A, a 16 bit device has responded, so the data is properly routed to the lower two byte latches 600 and 602 of the 32 bit double-word which will be provided to the master unit.

The next edge of the BCLK signal is a falling edge which occurs at time 418. At this time the BALE signal is made high to indicate that a valid address is appearing on the SA lines. This address has been presented on these lines by the system board. The system board automatically transfers the address signals LA<19-2> to the address signals SA<19-2> in all cycles. In the initial ISA standard cycle which occurred at time beginning at least time 410, the lower two bits of the full address were developed from the BE*<3-0> signals presented on the 32 bit connector 32. These signals were properly decoded to provide the proper two bits necessary for the lowest two bits of the address, which were then presented on the SA<1-0> lines on the 8 bit bus 8 at time 406. At time 418 when the BALE signal goes high, the lower two bits of the SA address signals can be properly incremented based on the desired data width and location as determined from the BE* signals and on the data width and location of the responding device. This will be more clearly described during the system board state machine operation description.

At time 420, the BCLK signal undergoes a rising edge and the BALE signal is made inactive or low. Also at this time, the MRDC* signal is again made low to indicate that a read operation is occurring. At this time it is also determined whether a 16 bit device will be responding, based on the state of the M16* signal. In cycle A, a 16 bit device will be responding as the M16* signal is in a low or active state. The NOWS* signal is made low before the falling edge of the BCLK signal which occurs at time 422. Therefore, the system board can determine that this is a no wait state operation and properly move through the state machine to commence completion of the read operation. At any time after time 420, it is noted that the MEM32* signal may be made low by he system board to indicate that a 32 bit cycle will be now occurring to the master unit. This is done so that the master unit timing and state machine control need not necessarily be based merely on the RDY32 signal but can also be made to respond to the MEM32* signal. For instance, instead of merely waiting until the RDY32 signal is made active, the master unit could respond to the MEM32* signal going low prior to a designated rising edge of the BCLK signal. This is to provide flexibility to the master unit designer.

At the next rising edge of the BCLK signal, which occurs at time 424 and is the next edge, the MRDC* signal is made high to indicate hat a read operation is completing according to the ISA standard. Additionally, at this time the data which has appeared on the lower 16 data lines is properly routed to the latches 604 and 606 which will be able to provide the data to the upper 16 bit data lines which are present on the 32 bit connector 32 because this is the high word read of a 32 bit double-word access. The MEM32* signal must be low prior to time 424 to allow the master unit to base timing and control tests on the MEM32* if desired. Following the rising edge of the BCLK signal at time 424, the RDY32 signal should be released by the system board so that the RDY32 line goes high before the next falling edge of the BCLK signal to indicate that the device now has data which can be made available to the master unit. On that next falling edge of the BCLK signal, which occurs at time 426, the master unit has determined that the addressed device is now ready and will be presenting data which is stable at the next rising edge of the BCLK signal, so that the master unit can now present the address information and M-IO signal for the next cycle, which in this case is cycle B, a 32 bit read operation which will be performed by a 32 bit device. This early presentation of the address information allows the system to operate at a slightly higher rate than would be possible if the information was delayed until the data was obtained. The master unit can at this time change the state of the W-R signal if desired.

On the rising edge of the BCLK signal which occurs at time 428, the data has been presented by the system board to all 32 data lines which appear on the three connectors 8, 16 and 32. The data information is latched or otherwise stored at this time by the master unit to complete the read operation and to complete cycle A. Additionally, at this time, the START* signal is made low to indicate the start of a new cycle, the CMD* signal is made high to indicate the completion of a cycle, the BE*<3-0> signals are asserted and W-R signal is asserted, if it has not previously been set at time 426.

Cycle B is a 32 bit read command to a 32 bit device which will respond with no wait states. The cycle started at times 426 and 428 as indicated. At the falling edge of the BCLK signal which occurs at time 430, the BALE signal is made high by the system board. Prior to the next edge of the BCLK signal, which is a rising edge, the MEM32* signal will be made low by the responding device to indicate that a 32 bit standard device will be responding. The rising edge of the BCLK signal occurs at time 432, at which time the BALE signal is made low. Also, at this time the START* signal is made high and the CMD* signal is made low to begin the transition in the 32 bit cycle. At the next edge of the BCLK signal, which is a falling edge which occurs at time 434, the master unit samples the RDY32 signal to determine if the device is ready. In this case, the device is ready, which allows the master unit to present a new address on the LA address lines and the new states of the M-IO and W-R signals on their lines, therefore beginning a new cycle C. On the rising edge of the BCLK signal which occurs at time 436, the START* signal is made low to indicate the beginning of a new cycle, the CMD* signal is made high to indicate the end of the cycle, the BE*<3-0> signals are asserted and the data which has been presented by the address device is read from the 32 data lines for use by the master unit.

Cycle C is a 32 bit read operation performed to a 32 bit device. One wait state will be inserted because the 32 bit device is not sufficiently fast to respond without the additional wait state. The events which occur on the various signals at times 438 and 440 are similar to those in cycle B at the same respective edges of the BCLK signals with respect to the beginning of the cycle state. However, in cycle C, the RDY32 signal is low at the required falling edge of the BCLK signal which occurs at time 442. This indicates to the master unit that the device will not be responding in the normal cycle time and therefore a wait state is going to be performed. At this time, the master unit can change the address if desired for the next device or location to be addressed and can change the M-IO and W-R signals as will be needed for the next state. This would require the addressed slave unit or responding unit to have latched the addresses and the M-IO and W-R signals prior to this time, which could readily be performed at the falling edge of the BCLK signal at time 442 or on the rising edge of the BCLK signal at time 440, for example based on the falling edge of the BALE signal or the rising edge of the START* signal. The wait state is a full cycle of the BCLK signal, so that at the rising edge of the BCLK signal, at time 444, no changes are made in any of the signals. The RDY32 signal is then raised prior to the next falling edge of the BCLK signal 446, so that at time 446 the master unit determines that the device is ready and the cycle completes as in cycle B. Thus at time 446, a new address is presented to begin cycle D.

Cycle D is a 16 bit read request and is responded to by a 16 bit device which will respond in a normal condition on the 8 and 16 bit connectors 8 and 16 using the ISA standard. Thus, at the falling edge of the BCLK signal at time 450, the BALE signal is made high and the proper address bits are asserted on he lower two lines of the SA lines. At time 456, which is a rising edge of the BCLK signal, if it is determined that the MEM32* signal is high, this 16 bit request will not be performed by a 32 bit device. Therefore, the RDY32 signal is made low by the system board prior to the falling edge of the BCLK signal at time 458 to indicate to the master unit that a 32 bit standard device will not be ready. At time 456, the START* line is made high by the master unit and the CMD* line is made low by the master unit to indicate the continuation of the cycle. At the rising edge of the BLCK signal at time 456, the BALE signal is made low, the MRDC* signal is made low to indicate that this is a memory read cycle, and the M16* signal is sampled to determine whether this will be a 16 bit or 8 bit operation. In the case of cycle D, this is a 16 bit operation.

At the falling edge of the BCLK signal at time 458, the master unit begins to sample the RDY32 signal to determine if the requested device is ready. In this case because it is a 16 bit operation, the device is not ready, as indicated because the system board has made the RDY32 signal low to allow the system board time to properly perform the necessary operation utilizing the ISA standard.

At the falling edge of the BCLK signal at time 458, the system board determines whether the NOWS* signal has been asserted to indicate that this is a fast 16 bit device. In the case of cycle D, it is not a fast device and therefore operation proceeds to the rising edge of the BCLK signal at time 460 and to the falling edge of the BCLK signal at time 462. At this point, the MEM32* signal is made low by the system board because this is nearing the completion of a 16 bit read which is all that was requested, and therefore the MEM32* signal can be triggered to indicate to the master unit that the requested cycle is completing. At the rising edge of the BCLK signal at time 464, the MRDC* signal is made high to indicate completion of the read cycle. The data which is obtained on the D<15-8> and D<7-0> line is properly routed and latched for assertion to the proper data lines as requested by the master unit. At this time, the RDY32 line is generally made high to indicate to the master unit that the device is now capable of responding to the information request in the normal orderly fashion.

Several things happen at the falling edge of the BCLK signal at time 466 in the illustrated cycle D. The first thing of interest is that the MREQn* signal is made high. This could be in response to several factors, such as the master unit responding to he removal of the MDAKn* signal, which indicates control must be passed to another controller, and beginning to acquiesce and get off the bus or the case where the master is done with its operations for which it needs the bus and therefore no longer needs the bus. This raising of the MREQn* signal is the beginning of the transfer from the master unit to the next unit which will control the bus. Therefore at time 466, the master unit must float the address lines and several address control lines, the LA<31-2> lines, the BE*<3-0> lines and the M-IO and W-R lines, so that the next device can freely use these lines. Finally at time 466, the master unit samples the RDY32 signal and in this case determines that the device will be responding. On the rising edge of the BCLK signal at time 468, the CMD* signal is made high to indicate that the cycle is finishing and &he data which has been presented by the system board on the desired data lines is utilized by the master unit for its requested operation. At the falling edge of the BCLK* signal at time 470, the master unit floats the START* and CMD* lines which are to be controlled by the next user of the bus. Time 470 is the beginning of a cycle for the next bus controlling unit, and thus is equivalent to time 402. It is noted that the MDAK* signal goes high at time 470 to indicate that the priority controller on the system board has acknowledged the relinquishment of the master unit's status. This completes the illustrated timing diagram of FIG. 2 for a master unit memory read sequence.

Figure 3:
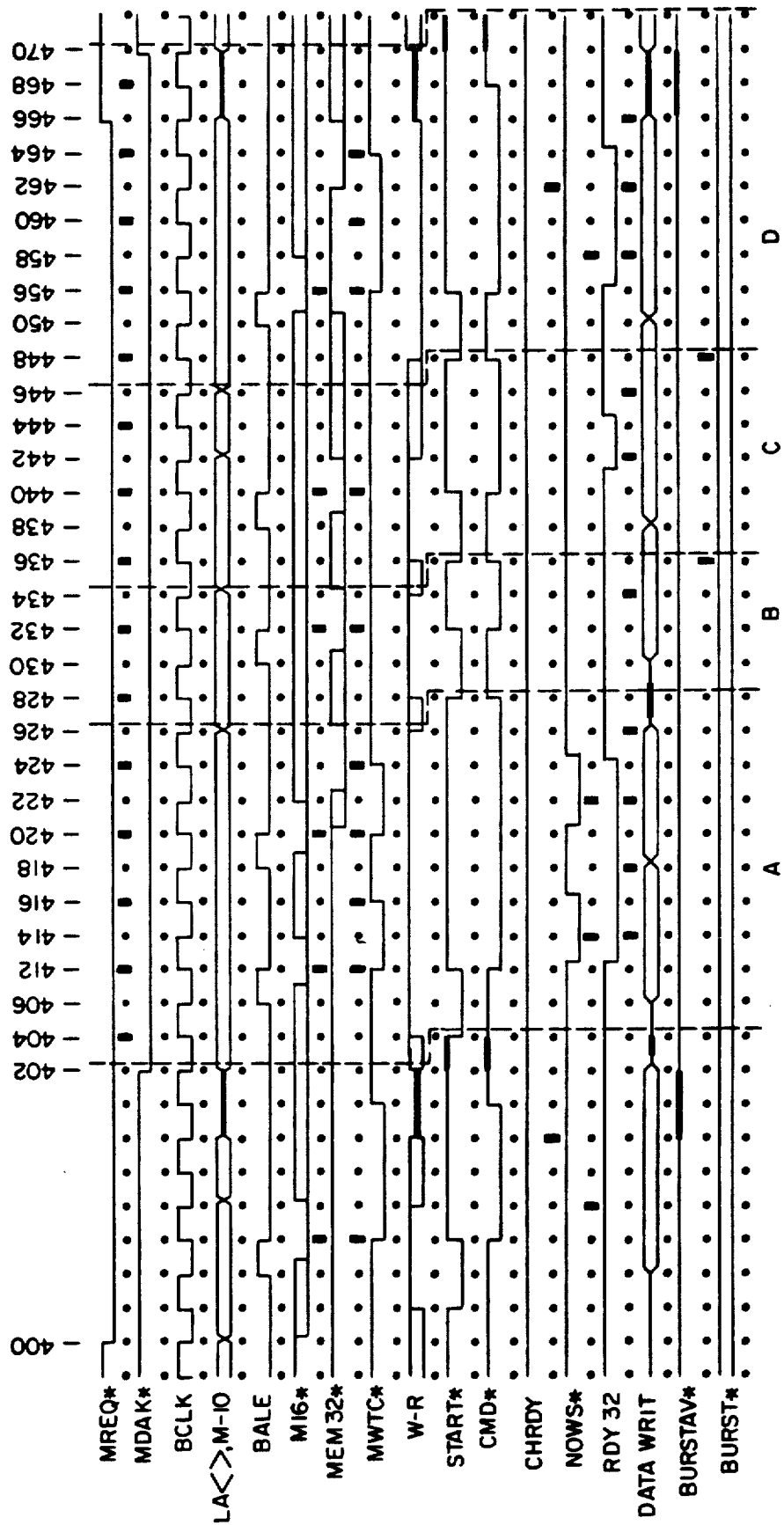

FIG. 3 illustrates the same cycles A, B, C and D in the case of a master unit memory write operation. In general, the same events occur at the same time with the exception of the W-R signal, the MWTC* signal and the data which is available on the data lines. Generally the W-R signal was in a low state during the read operation and is in a high state during a write operation. The MWTC* signal (and SMWTC* signal) appear in the place of a MRDC* signal to indicate to ISA standard devices that a memory write cycle is occurring. The data appears differently on the data lines D<32-16>, D<15-8> and D<7-0> because of the write operation. For example, at time 406, the master unit is presenting the data it wishes to be written onto the data lines. Then at time 412, the system board stores the data in the latches 600–606 because it is determined that a 32 bit standard device will not be responding to this write operation and therefore the data lines will be floated by the master unit. The master unit also recognizes that a 32 bit standard device will not be responding and floats the data line so that the system board can perform the necessary write operation using the lower data lines as required.

At time 412 the system board also begins presenting the lower 16 bits of data onto the data lines D<15-8> and D<7-0> in cycle A for storage by the device which is responding. The data can be properly routed in this first ISA standard subcycle based on the BE*<3-0> values so that the proper data is present on the D<15-8> and D<7-0> lines should an 8 or 16 bit device respond. The data is presented until time 418, when the next ISA standard write operation commences to the next address. Then at time 426, the information is no longer needed on the data lines because it has been stored by the responding device, so the system board and the master unit float the data lines.

In cycle B, the master unit begins presenting the data at time 430, which in that cycle corresponds to the beginning of the BALE signal. The data remains on the data lines until one-half cycle of the BCLK signal into cycle C. This extension of the data on the data lines is provided for continuity with the previous ISA standard and to allow circuit designers more flexibility. A similar extension of the data being written appears in cycle C where it carries over to time 450.

Cycle D performs much like cycle A in that the data is only briefly presented by the master unit on the data lines from time 450 to time 456, at which time it is latched by the system board for proper routing and presentation on the lower 16 bits of the data lines as necessary. In other respects, the write operation is similar to the read operation.

Figure 4:
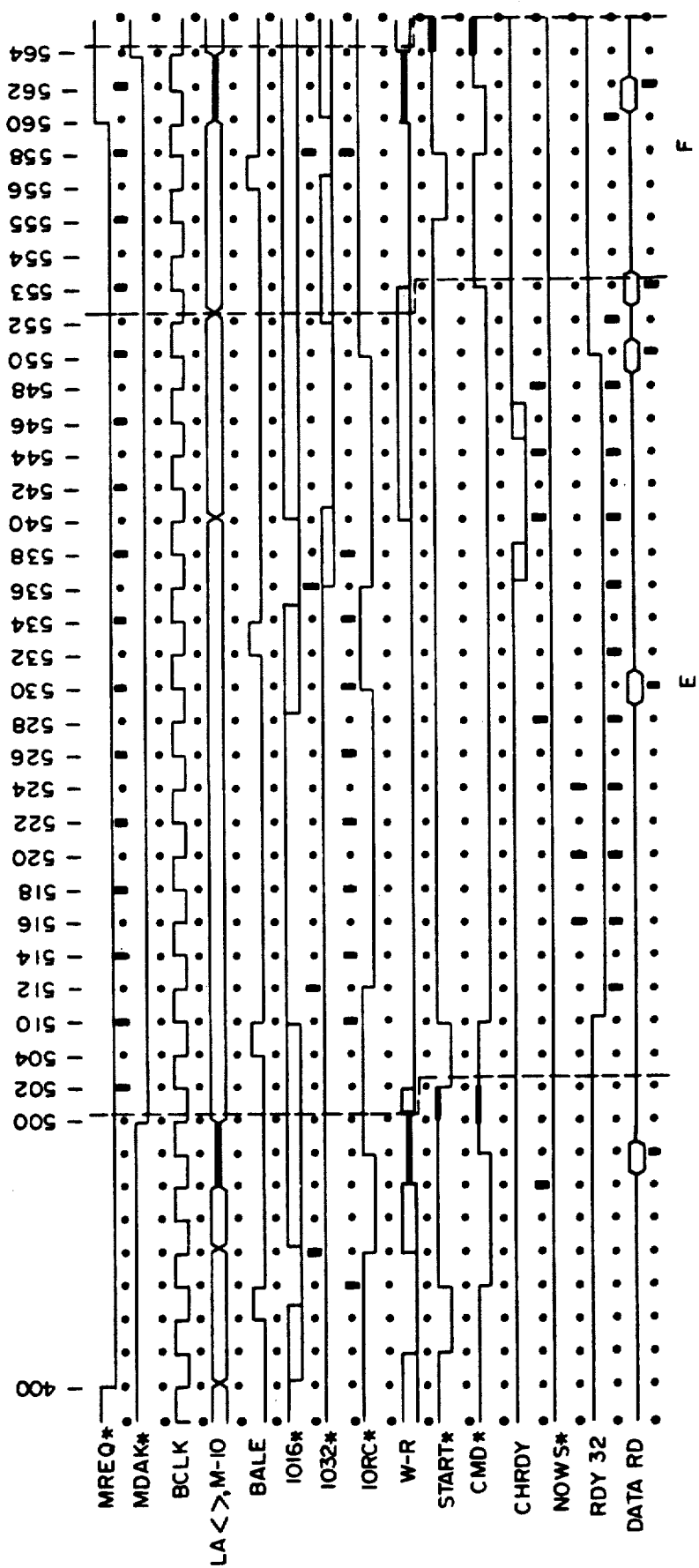
Figure 5:
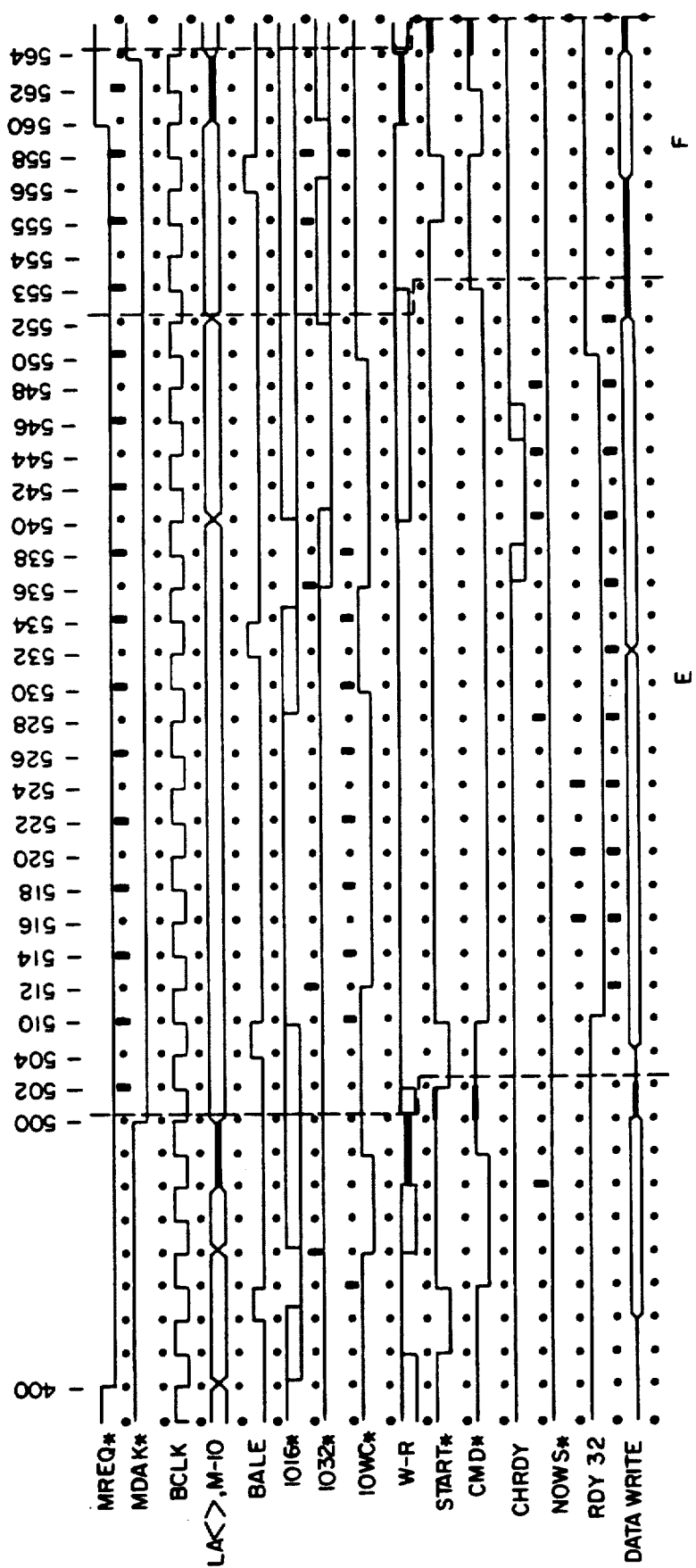

FIGS. 4 and 5 display the timing diagram for master unit I/O read and write operations, respectively. Two exemplary cycles E and F are shown, the first being a 24 bit operation which is responded to by first an 8 bit device and second by a 16 bit device which needs two wait states. The second cycle is a 32 bit operation which is responded to by a 32 bit standard device.

The first cycle, cycle E, commences at time 500, which is when the MDAK* signal and the BCLK signal go low. At that time the master unit provides the address value to the LA<31-2> lines and the M-IO line is made low to indicate an I/O space operation. The W-R line may be made low at this time, or on the next edge of the BCLK signal. On the rising edge of the BCLK signal which occurs at time 502, the START* signal goes low to indicate the beginning of the 32 bit standard cycle and the BE*<3-0> values are asserted by the master unit. At time 504, the BCLK signal goes low and the BALE signal goes high to indicate to all devices on the 8 and 16 bit connectors 8 and 16 that a valid address is present on the SA lines. The SA address value is developed in the same manner as in the memory operations. At the rising edge of the BCLK signal at time 510, the IO32* signal is sampled to determine whether a 32 bit standard device will respond to the request. In cycle E, a 32 bit standard device will not respond and therefore the IO32* signal is high at time 510. This high level indicates to the master unit that it must release the data bus and continue to hold the address lines. This high level of the IO32* signal indicates to the system board that the RDY32 line must be pulled low to indicate that the requested information will not be available to the master unit within the normal 32 bit standard cycle time. Also at this time, the START* signal is made inactive and allowed to go high and the CMD* signal is made active or low to indicate the commencement of the second portion of a 32 bit standard cycle. At time 510 the BALE signal is taken low and the addresses that are presented in the SA address lines are latched by the system board. Sometime before the next falling edge of the BCLK signal, the IO16* signal must be asserted low if a 16 bit device will be responding to the request. In the case of the illustrated cycle E, the first request is not responded to by a 16 bit device and therefore the IO16* signal remains high for the entire presentation of the first address.

The BCLK signal undergoes a low to high transition at time 512. At time 512 the master unit determines that the requested device is not ready by means of the RDY32 signal and proceeds to evaluate the RDY32 signal at each falling edge of the BCLK signal until the RDY32 signal is high. Also at time 512, the IORC* signal goes low to indicate the commencement of an I/O read operation. It is to be noted that both the sampling of the IO16* signal and the change in the IORC* signal occur one-half BCLK signal cycle later than their corresponding counterparts in the memory space operation. This is done to remain consistent with the ISA standard.

At time 512 in cycle E, the IO16* signal is high which indicates that an 8 bit ISA standard operation will be performed. The BCLK signal proceeds through changes at times 514, 516, 518, 520, 522, 524, 526 and 528 during this regular operation of an 8 bit cycle. At the rising edge of the BCLK signal which occurs at time 530, the IORC* signal is made high to indicate the end of the 8 bit I/O read operation. At this time the data which is presented on the D<7-0> lines on the 8 bit connector 8 is transferred to the appropriate latch 602 for presentation to the 32 bit master unit at the appropriate location in the 32 bit double word. Additionally at this time the lower two bits of the address can be incremented and the new address values prepared for presentation to the SA<1 0> lines to allow devices to determine the next address and if they will respond.

On the falling edge of the BCLK signal which occurs at time 532, the BALE signal is made high or active to indicate that a valid address is appearing on the SA lines to allow devices to respond. The BALE signal is made low at time 534 when the BCLK signal undergoes a low to high transition. At the falling edge of the BCLK signal at time 536, the IO16* signal is sampled to determine if this will be a 16 bit operation. The IORC* signal is also made low to indicate that an I/O read operation is occurring. In cycle E this is a 16 bit operation and the IO16* signal is low at this time. The cycle proceeds to the rising edge of the BCLK signal at time 538 and to the falling edge of the BCLK signal at time 540. At time 540, the system board samples the CHRDY line to determine if the device which is responding is ready within the normal time cycle. In the case of cycle E it is not, and therefore at least one wait state will be added. The system board responds to the CHRDY signal in a similar manner during memory space operations, as will be seen more clearly in the state machine description. The cycle proceeds to the next falling edge of the BCLK signal at time 544 where the CHRDY line is again sampled. In the case of cycle E, the CHRDY signal is still low to indicate that the I/O device is not yet ready. Therefore, the cycle continues until the next falling edge of the BCLK signal at time 548. In this case, the CHRDY signal has gone inactive or to the high state to indicate the device is ready. Therefore the completion of the cycle commences. At the rising edge of the BCLK signal at time 550, the IORC* signal is made high to indicate the termination of the ISA standard I/O read operation, the RDY32 signal is allowed to go high to indicate to the master unit at the next falling edge of the BCLK signal that the cycle will terminate and the data which has been presented on the lower 16 bits of the data bus is properly routed and latched in latches 604 and 606 for presentation to the master unit.

On the falling edge of the BCLK signal at time 552, because this is the end phase of the cycle, a new address value and M-IO, and possibly W-R, signals are presented. Additionally, the data in the latches 600–606 is enabled to the proper data lines. On the rising edge of the BCLK signal at time 553, the data which had been enabled from the system board to the proper data lines is latched in and read by the master unit. Additionally, the CMD* signal is made high to indicate the end of a cycle and the BE*<3-0> signals are presented.

Cycle F has commenced at time 552 and is a 32 bit read operation to the I/O space, which will be responded to be a 32 bit standard device which does not require any wait states. However because this is an I/O space cycle immediately following an I/O space cycle, the START* signal cannot be lowered at the same time as the CMD signal is raised to allow sufficient time for other signals to properly complete. Therefore the BCLK signal proceeds to have a low to high transition at time 554 and a high to low transition at time 555. Sufficient time has elapsed at time 555 so the master unit can lower the START* signal, which it does.

At the falling edge of the BCLK signal at time 556, the BALE signal is made high to indicate to all devices that an address is available for interpretation. In this case, at the next edge of the BCLK signal, a rising edge at time 558, the IO32* signal is low indicating that a 32 bit device will respond. Additionally, the START* signal is made high and the CMD* signal is made low to indicate the transition to the next portion of the cycle and the BALE signal is changed to a low state. At the falling edge of the BCLK signal at time 560, the MREQn* line is allowed to go high to indicate that the master unit's interval is completing. At time 560 the address lines are released, as well as the M-IO line and the W-R line, which has generally been held low because this has been a read operation sequence. At the following rising edge of the BCLK signal, which occurs at time 562, the CMD* signal is made high to indicate the end of the cycle and the data which has been pres-
ented by the 32 bit standard device is sampled by the master unit. At time 564, which is the falling edge of the BCLK signal, the START* and CMD* signals are allowed to float for use by the next bus controller and the MDAKn* line is made high by the priority controller on the system board to acknowledge the passing of control.

Exemplary I/O space write operations by the master unit as shown in FIG. 5 are similar to I/O space read operations, except that the IOWC* signal is asserted instead of the IORC* signal during the 8 and 16 bit ISA standard operations and the W-R line is generally held in the high state, in contrast to its low state condition in the read operation.

Additionally, the data presented by the various devices is present for different times as befitting the different operation. In the 24 bit write operation which is performed in cycle E of FIG. 5, the data is presented by the master unit at time 504 and is latched by the system board at time 510, when it is determined that a 32 bit standard device will not be responding to the I/O operation request. This data is then properly channeled by the system board according to the addressing information and the response of the IO16* signal. The data is then presented until time 532, which it is noted is one-half BCLK signal cycle after the removal of the assertion of the IOWC* signal. This extension of the data on the data lines is again to provide compatibility with the previous ISA standard where the write cycles were presented one-half signal cycle longer than when the read information, which was latched. At time 532, the remaining or next group of data which must be written to the responding device is presented on the data lines as appropriate as determined by the state of the BE*<3-0> signals, which device is currently responding, and how many bytes remain in the operation. The data is presented until one-half BCLK signal cycle after the IORC* signal is released at time 550.

Cycle F shows a write operation for a 32 bit cycle. In this case, it must be noted that the data is presented by the master unit until time 562, one-half BCLK signal cycle after the CMD* signal is made high, which normally indicates the end of a cycle. This is so that standard and analogous logic can be used by 32 bit I/O devices as is used by 8 and 16 bit I/O devices for write cycle operations.

Figure 6A:
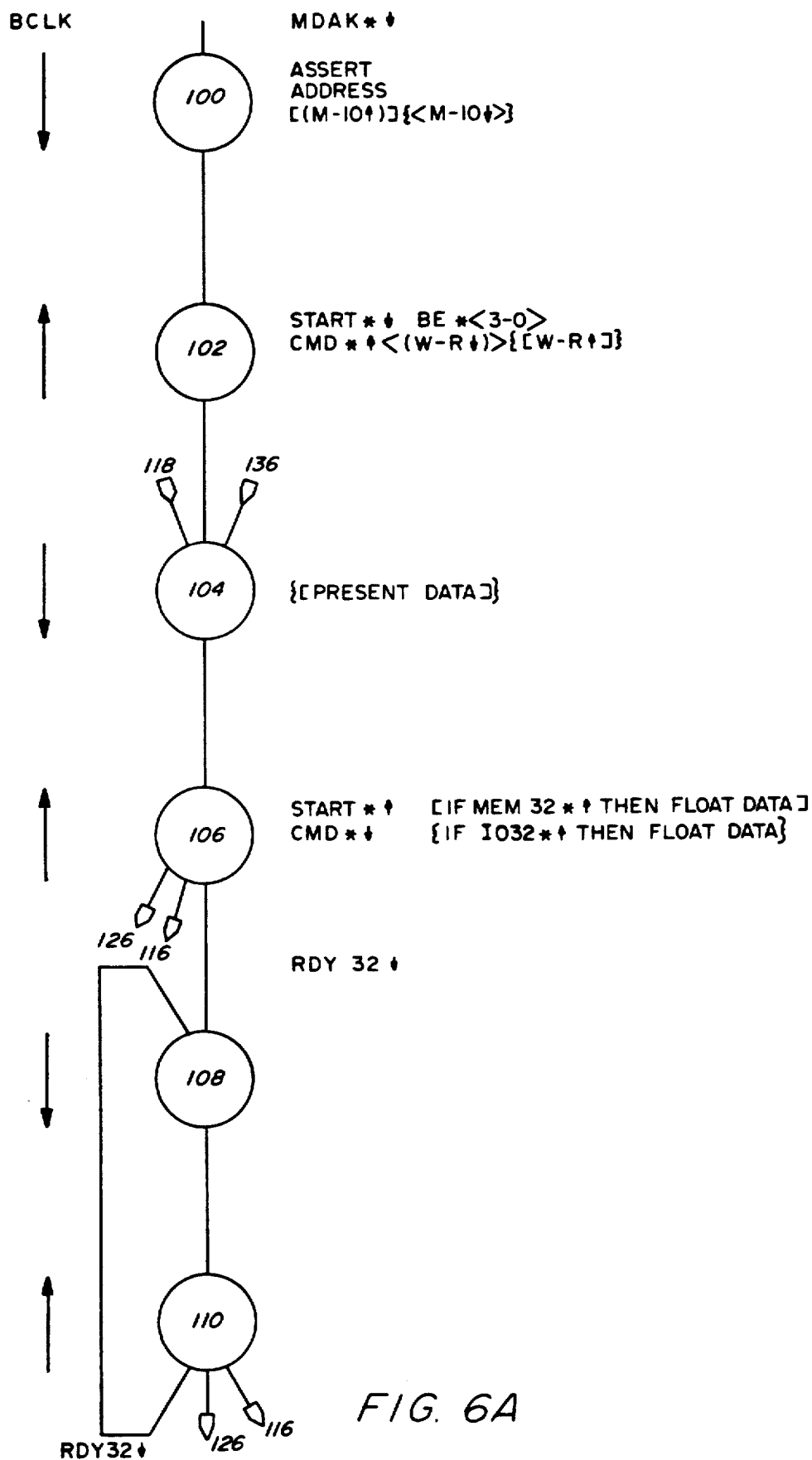
FIGS. 6A, 6B and 6C are state diagrams indicating the operations of portions of the circuitry of a master unit in a computer system incorporating the present invention.
Figure 6B:
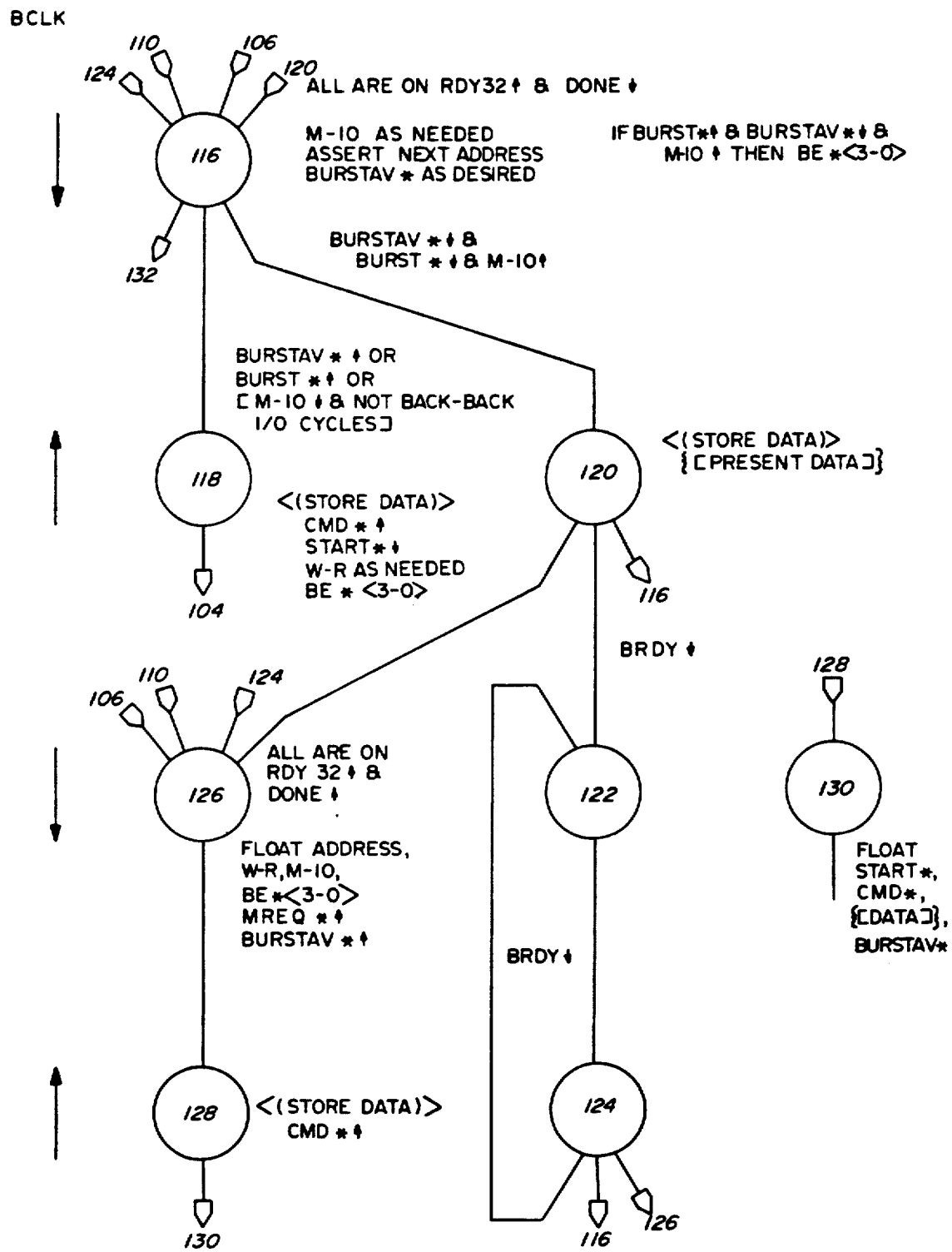
Figure 6C:
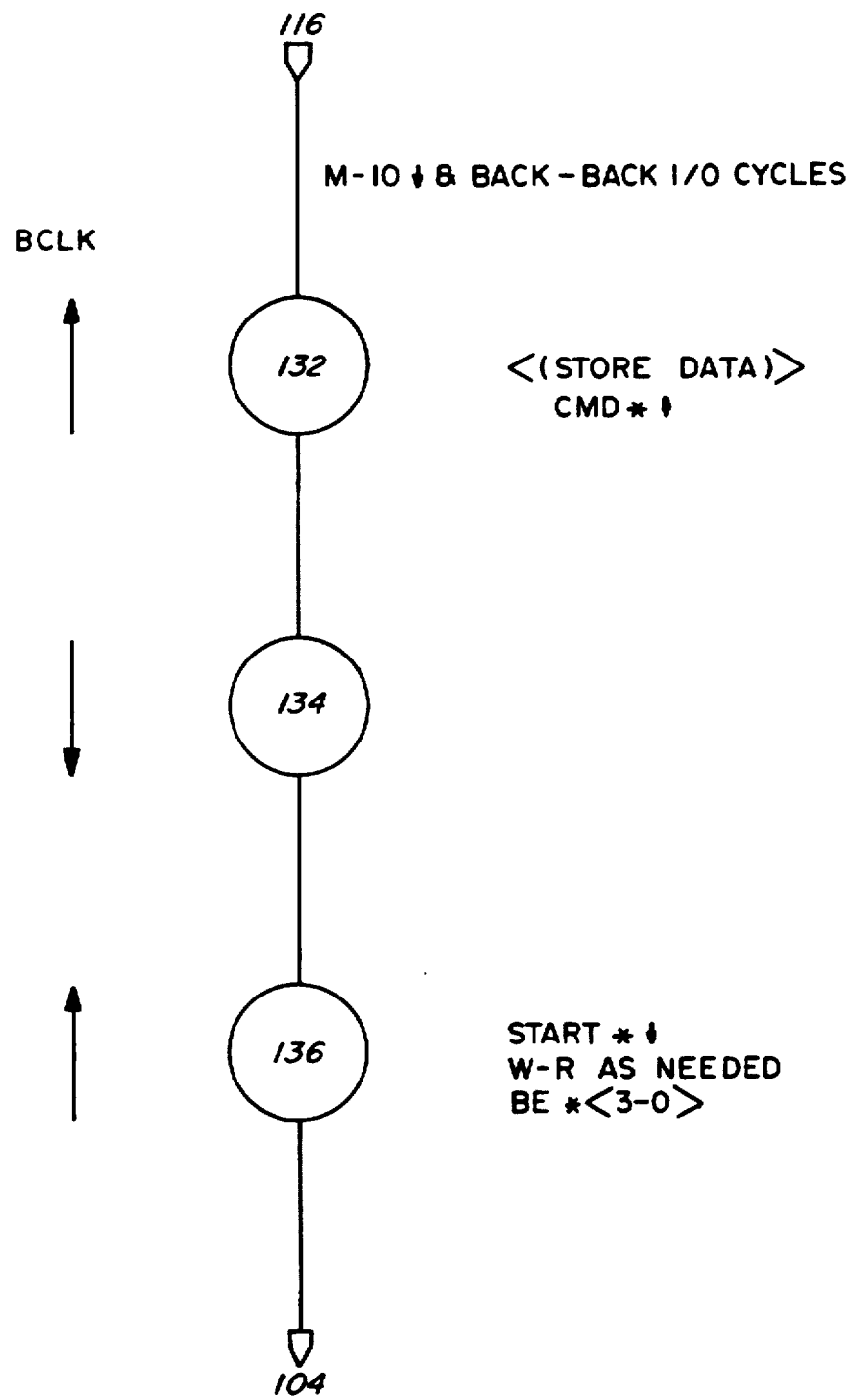

An exemplary state machine diagram showing the operation of the master unit is illustrated in FIGS. 6A and 6B. In explanation of the state machine diagram, information which is provided generally next to one of the circled states is an operation which is triggered or commenced based on the appropriate edge of the BCLK signal. Operations which are within parentheses are performed in memory read operations, while operations which are inside square brackets are performed during a memory write operation. Operations which are contained within angle brackets are performed during an I/O read operation and operations which are within braces are performed during I/O write operations. Branching conditions from a given state, which must be true at the next edge of the BCLK signal, are generally indicated next to the branch, at times as the branch exits the state and at other times as the branch enters the next state, depending upon the space available in the Figures. The appropriate BCLK signal transition is located in a left-hand column for reference.

Master unit operation begins at state 100 after entry when the MDAKn* signal goes low, indicating that this master unit's operation can commence. In state 100, the master unit asserts the address onto the LA<31-2> lines and the M-IO signal to the M-IO line. The master unit proceeds to state 102, where the START* signal is made low, the CMD* signal is made high, the BE*<3-0> values are asserted and the W-R signal is positioned at the appropriate state based on the operation to be performed. The address information is then properly converted to the lower two bits of the SA address by the system board and all of the address bits that are necessary are transferred for assertion on SA lines Control proceeds to state 104, where the data is presented by the master unit to the 32 bit data bus if this is a write operation, either to the memory space or the I/O space.

Control proceeds to state 106 where the START signal is made high and the CMD* signal is made low. If the operation being performed is a memory write operation, the MEM32* signal is analyzed, and if it is high, the data which is being presented to the data lines is removed and the lines are allowed to float, so that they can be controlled by the system board as required. A similar event occurs if this is an I/O operation and the IO32* signal is at a high state.

There are three possible exits from state 106. The three branches or exit conditions are based first on whether the device is ready or not as indicated by the RDY32 signal. If the RDY32 signal is high, then a second level determination is made as to whether this is the final cycle in this master unit's bus control as indicated by the state signal which is internal to a master unit and is referred to as the DONE signal.

If the RDY32 signal is low, control proceeds to state 108, where no operations are performed. Control then proceeds on the next BCLK signal edge to state 110. If the RDY32 signal is still low, control returns to state 108 and thus a loop is formed in the master unit waiting until the RDY32 signal goes high to indicate that the device is ready to respond. If the RDY32 signal was high prior to the falling edge of the BCLK signal after entering state 110 or state 106, and the DONE signal was low, indicating that this was not the end of the master's control of the bus, control proceeds from state 110 or state 106 to state 116. If the RDY32 signal was high, indicating that &he device was ready, and this was the final cycle in a master control state as indicated by the DONE signal being high, then control proceeds from state 110 or state 106 to state 126.

Considering first the condition that the device is ready, based on RDY32 signal being at high level, and that this is not the last cycle, control then proceeds to state 116 where the next 32 bit address is asserted by the master unit, the next operation's M-IO signal is asserted, and BURSTAV* is set as desired to indicate commencement, continuation or completion of a burst cycle. Additionally, if the BURST* signal is low, the BURSTAV* signal is being lowered or is low and this is a memory cycle, the BE*<3-0> signals are asserted. If the BURSTAV* signal is high, if the BURST* signal has not been asserted by the device or if it is an I/O operation, as determined by the M-IO signal being low, and back to back I/O operations are not being performed, control proceeds from state 116 to state 118, where the CMD* signal is made high and the START* signal is made low, the W-R signal is changed as necessary, the new BE*<3-0> lines are set and, if this is a read operation, the data which is available on the data lines is stored or otherwise latched by the master unit. Control then proceeds from state 118 to state 104, where the cycle is restarted.

If back to back I/O operations are being performed, control proceeds from state 116 to state 132, where the CMD* signal is set high and if this is a read operation, the data is stored by the master unit. Control proceeds to state 134 and to state 136, where the START* signal is lowered, the W-R signal is asserted as necessary and the BE*<3-0> signals are asserted. This delay has been to allow certain other I/O operation related signals to complete. Control then returns to state 104.

If a burst operation is being performed as indicated by the BURST* and BURSTAV* signals being low and the M-IO signal being high, control proceeds from state 116 to state 120, where the data is stored if this is a read operation or new data is presented if this is a write operation. If this is a standard burst cycle wherein the RDY32 signal is high and it is not the final cycle of the master unit's control of the bus, control proceeds to state 116, thus resulting in the desired short burst cycle. If however, this was a case where the device supporting the burst could not support this particular address location at a full speed, then the RDY32 signal would be low before the falling edge of the BCLK signal and control would proceed from state 120 to state 122 and from state 122 to state 124. If the RDY32 signal was still low, control would return from state 124 to state 122 to form a loop. It is noted that this is not expected to be a normal operation, but is provided for flexibility reasons.

Control proceeds from state 124 if the RDY32 signal is high to state 116 or state 126, depending upon whether the master unit has more cycles to complete. If, before the falling edge of the BCLK signal causing a transfer from state 120, it was determined that the RDY32 signal was high and that this was the last cycle in the master process, control proceeds to state 126, otherwise control proceeds from state 120 to state 116.

Figure 7A:
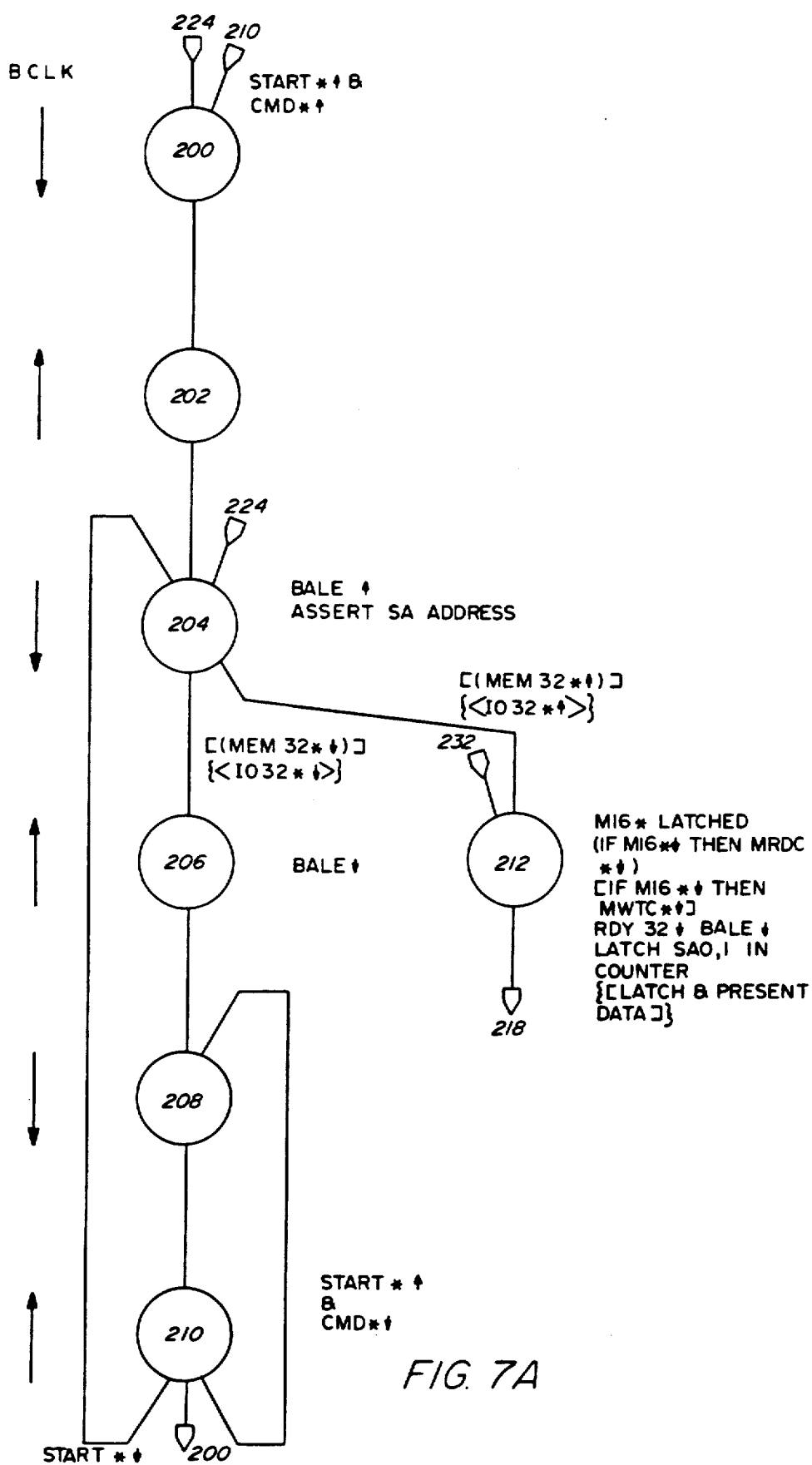
FIGS. 7A, 7B and 7C are state diagrams indicating the operations of portions of the circuitry of a system board when cooperating with a master unit in a computer system incorporating the present invention.
Figure 7B:
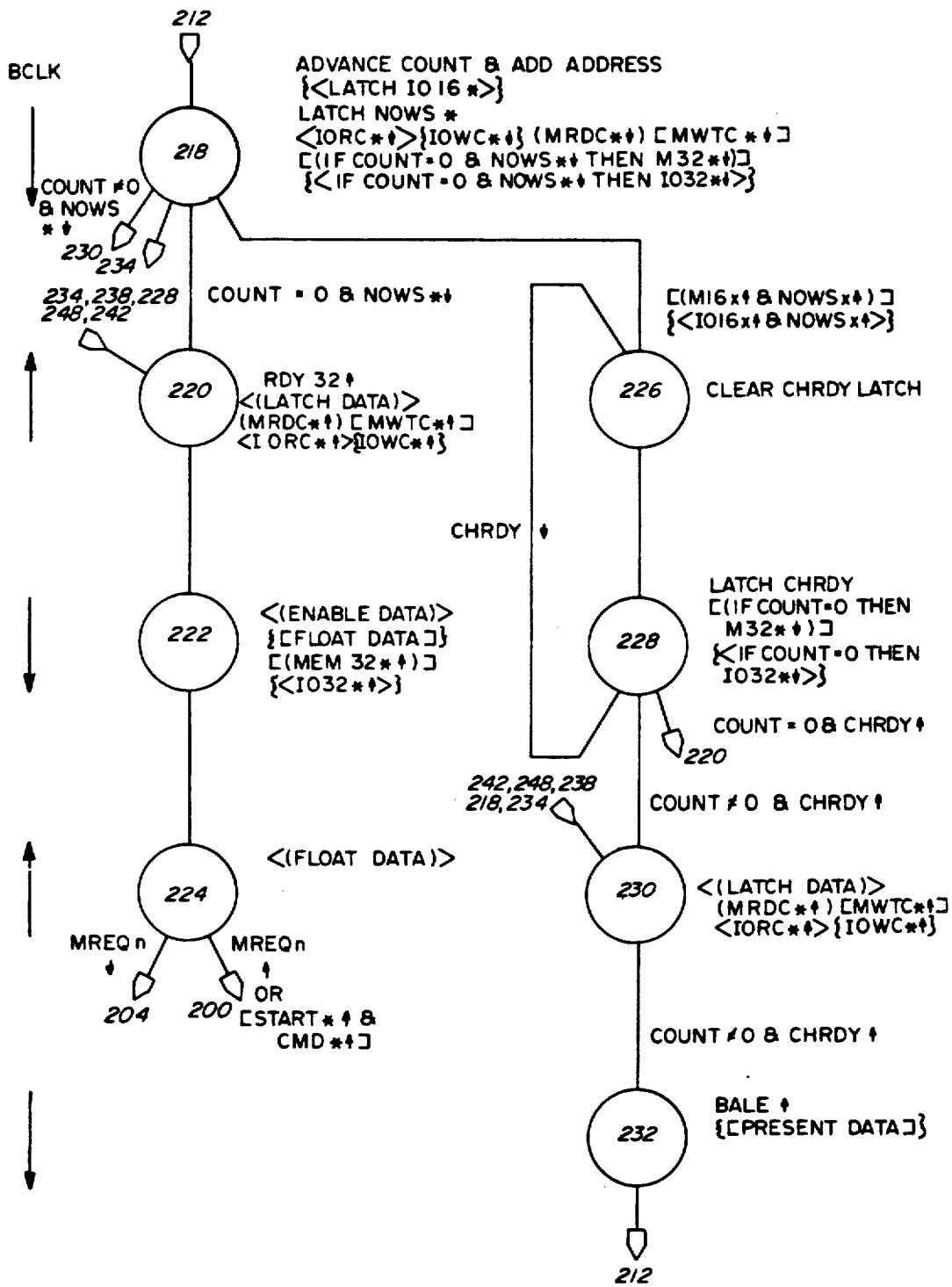
Figure 7C:
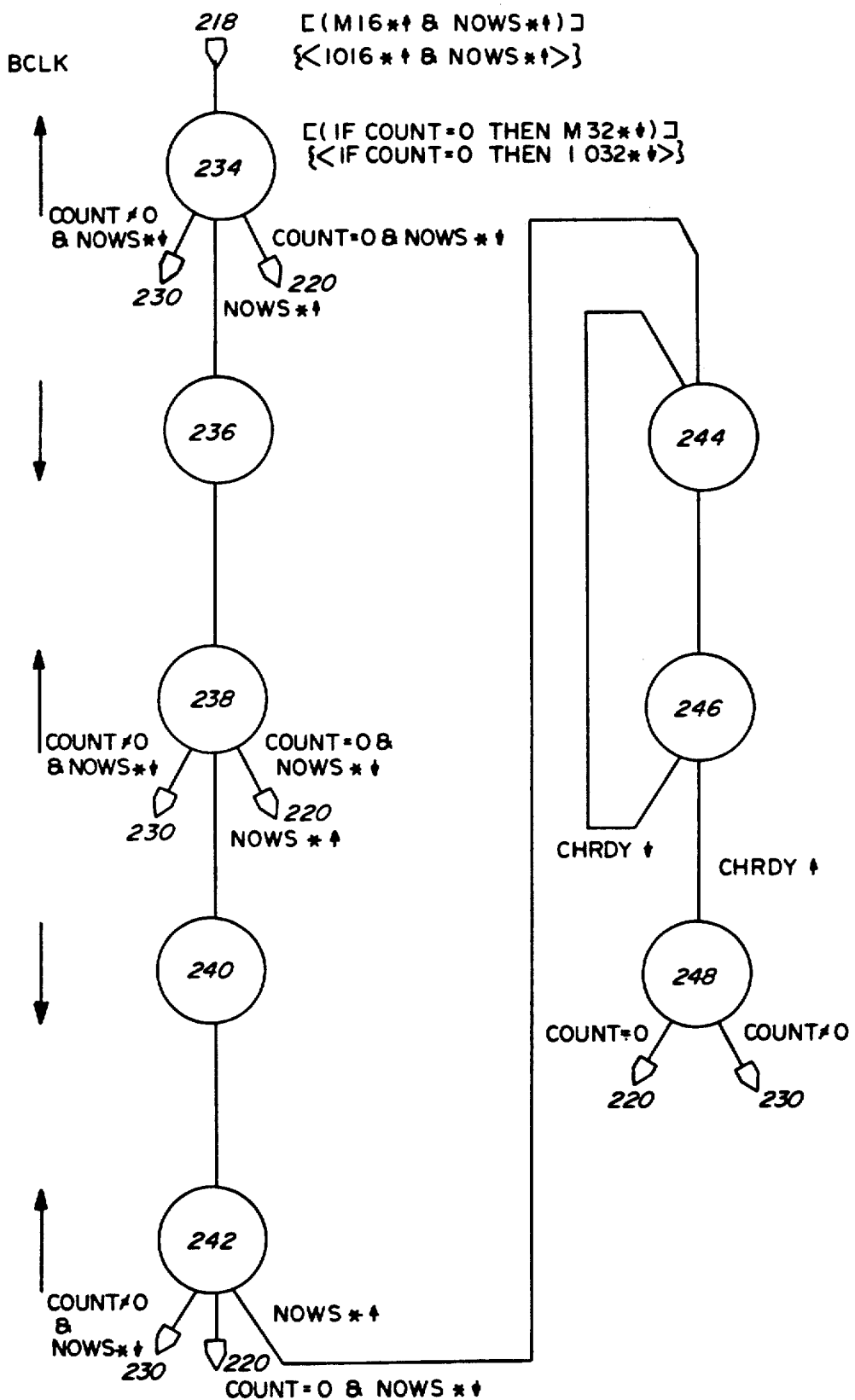

In state 126, the master unit floats the LA<31-2> lines, the BE*<3-0> lines, the W-R line, and the M-IO line, and sets the BURSTAV* line high. The master unit also raises the MREQn* line to indicate that it is preparing to relinquish control of the bus. Control then proceeds from state 126 to state 128, where the master unit stores the data present on the data lines from this cycle if the cycle was a read operation and also raises the CMD* line to indicate completion of the 32 bit standard cycle. Finally, control proceeds to state 130, where the master unit floats the START* and CMD* lines, the BURSTAV* line and the data lines, if a write operation was last performed. The master unit then proceeds to other operations internal to its circuit board if it has completed its own needs or it remains in a wait state and reasserts the master request signal, so that it can gain control of the bus a the next available opportunity. As can be seen, the logic that is therefore required in a computer system incorporating the present invention which utilizes two separate sets of state information and address control lines is simple and straightforward, especially compared to the complexity which would have resulted had the master unit been required to handle the full range of possibilities. Some of this potential complexity is illustrated in the state machine diagram for the system board, which is shown in FIGS. 7A, 7B, and 7C.

In contrast to the relative simplicity of the master unit logic as has just been described, the system board logic is relatively complex because it must understand and work with all the various combinations of the 16 and 8 bit circuit boards which are available, and do the necessary address counting, addition, and data byte arrangement and assembly necessary for converting between the various systems. However, in a computer system according to the present invention, the logic need only be provided one time on the system board, thus allowing the master units to have the simple logic previously described, instead of the full, complex logic which would be required if this logic were not presented on the system board, as made possible by the development of the two separate sets of state indication and address control lines.

Operation of the system board state machine is assumed to commence at state 200, which is equivalent to time 402 in FIGS. 2 and 3 or time 500 in FIGS. 4 and 5 and which occurs at the same time as state 100 in the master unit. Control proceeds directly from state 200 to state 202 at the next edge of the BCLK signal and from there to state 204 on the falling edge of the BCLK signal. At state 204 the BALE signal is made high by the system board to indicate the availability of addressing information on the SA lines. The LA lines are automatically routed by the system board to the SA lines which are appropriate. The lower two SA bits are automatically developed by a BE*<3-0> conversion unit, so that the full lower 20 address bits are available to be presented on the SA lines. The BALE signal is raised to indicate the presence of this information to the various units.

If the MEM32* or IO32* signal is low, as appropriate, control proceeds from state 204 to state 206. This branch occurs when a 32 bit standard device will be responding to the request. In state 206 the BALE signal is lowered. Control proceeds to state 208 and from state 208 to state 210. The system board then monitors the START* and CMD* signals to determine when the next 32 bit cycle is commencing. If the START* signal is high and the CMD* signal is low, indicating that a 32 bit device is not ready, control proceeds from state 210 to state 208. Thus the system board need not monitor the RDY32 line but need only monitor the START* and CMD* lines to perform this branch of the state machine. If, at the next edge of the BCLK signal, the START* line is low, control proceeds from state 210 to state 204, forming a loop. If, however, the START* signal is high and the CMD* signal is high at the falling edge of the BCLK signal, this is an indication that control is proceeding from the master unit or controller to the next bus controller or that back to back I/O operations have occurred and control returns to state 200 for the beginning of the entire cycle.

If after entering state 204 and at the rising edge of the BCLK signal, the MEM32* or IO32* signal, as appropriate, is high, this is an indication that the request will be responded to by an 8 or 16 bit ISA standard device. Therefore control proceeds to state 212 from state 204. In state 212, the RDY32 signal is lowered to indicate to the master unit that the device is not ready and to cause the master unit to enter a wait cycle loop. Additionally in state 212, the data which is present on the SA<1-0> address lines is latched into a 2 bit counter or adder. Also at this state the BALE signal is lowered and the M16* signal is latched for later use if this is a memory operation. If the M16* signal is low, the SMRDC*, MRDC*, SMWTC* or MWTC* signals, as appropriate, are lowered. Finally in state 212, if this is a write operation, the data which is appearing on the data lines is latched by the system board and routed to the appropriate data lines on the 8 and 16 bit connectors 8 and 16 as required. The data must be latched at this time because at this state the master unit floats the data lines to allow the system board to use the data lines as needed.

Figure 8:
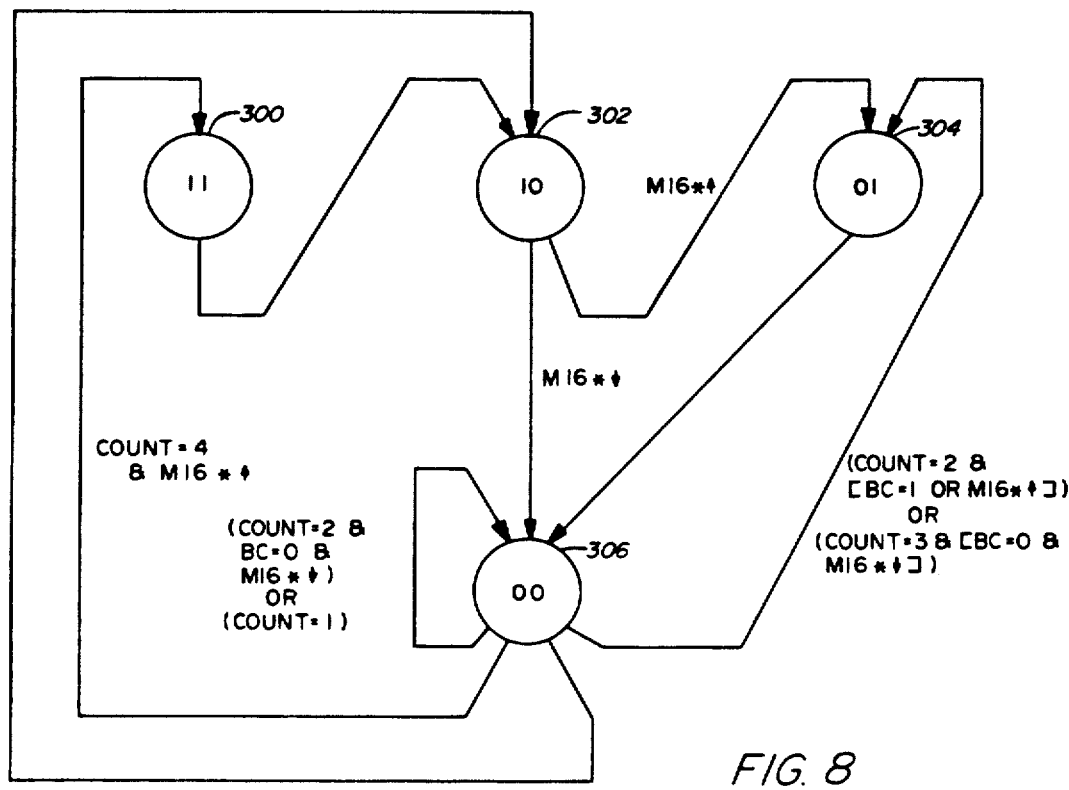
FIG. 8 is a state diagram indicating the operations of a counter utilized in the system board circuitry of FIGS. 7A-7C.
Figure 9:
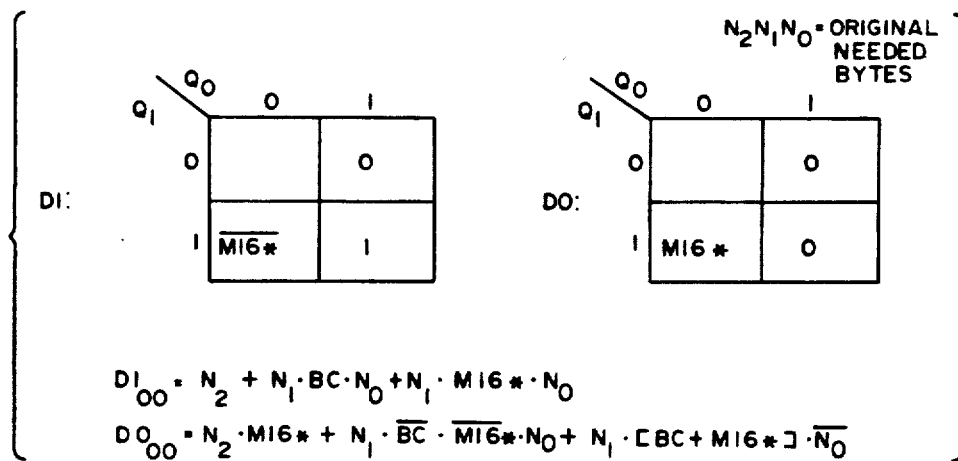
FIG. 9 is a Karnaugh map of the state diagram of FIG. 8.

Control then proceeds to state 218 and the byte counter state machine is advanced to its next state, as shown in the Karnaugh map (FIG. 9) and the appropriate number of bytes being worked with is added to the SA<1-0> address bits. The byte counter state machine is illustrated in FIGS. 8 and 9 and is used to indicate how many bytes are to be obtained from the various responding devices and whether the requested data will cross an address boundary, which means that a high byte of a 16 bit word will be requested. This knowledge is necessary to determine both the number of loops through the remaining portions of the system board state machine must be performed and to enable proper routing of the data to the various latches and buffers present on the system board and connected to the data lines D<15-8> and D<7-0>. The byte counter state machine is started from the 00 state 306 (FIG. 8) and is started according to the exit paths, which are shown in Boolean form in the equations of FIG. 9, where $n_2n_1n_0$ is the binary representation of the total number of bytes to be read as determined from the BE*<3-0> signals values. If, for instance, 4 bytes were to be read and a 16 bit device was responding, the counter state machine advances from state 306, where it has a value of 00, to state 302, where it has a value of 10. Additionally, this would indicate that the value 2 is to be added to the address value contained in the 2 bit address counter. If, however, a 16 bit device was not responding, control of the counter state machine proceeds to state 300, which has a value of 11 which indicates that 3 bytes are yet to be obtained and the address counter would add 1 to the address value. Control proceeds from state 300 to state 302 because only 1 byte would be read in any circumstance. The address counter would advance by 1 byte.

If the BE*<3-0> signals are such that 3 bytes were to be read initially and these the bytes were the low 3 bytes of the double-word, control starts at state 306 and proceeds to either state 304, if a 16 bit device is responding, in which case the address is incremented by 2, or proceeds to state 302 if an 8 bit device is responding, in which case the address is incremented by 1.

If the BE*<3-0> signals are such that the 3 high bytes were requested to be transferred, then control proceeds from state 306 to state 302 and the address is increased by 1, because either an 8 bit device will respond or this is the high byte of a word, so that only one byte can be read by a 16 bit device.

If the BE*<3-0> lines indicated that 2 bytes were to be read and these 2 bytes were the low byte of the high word and the high byte of the low word, then this would indicate an address boundary crossing condition and that 2 bytes were to be read, in which case the byte counter state machine would proceed from state 306 to state 304 because only 1 byte would be read in any circumstance, for reasons similar to entry of state 304, and only a 1 value would be added to the address value. Control also proceeds from state 306 to state 304 if any two bytes were desired and an 8 bit device responded, and 1 is added to the address value.

From state 302, which has a value of 10, indicating that 2 bytes are yet to be read, control proceeds to state 306, which is the 0 count condition, if a 16 bit device is responding, in which case the value 2 is added to the address register. If only 1 byte was to be returned because an 8 bit device was responding, control proceeds from state 302 to state 304, where only a single byte yet remains to be read, and the address is incremented by 1 so that the final byte can be obtained. Control proceeds from state 304 to state 306 and the address is incremented by 1 because only 1 byte remained to be transferred.

If two bytes are to be initially transferred, they are the high or low words, and a 16 bit device responds, or if only a single byte is to be transferred, control proceeds from state 306 back to state 306, because no more bytes would need to be transferred. FIG. 9 displays a Karnaugh map which can be utilized with a state machine formed of Dtype flip-flops to operate the state machine shown in FIG. 8.

Returning now to the system board state machine at state 218, the IO16* signal is latched if this is an I/O space operation, and the IORC* or IOWC* lines are asserted low as appropriate. The SMRDC*, MRDC*, SMWTC* or MWTC* signals are asserted in this state for memory read or write operations as appropriate. These signals may already have been set in state 212, but they must be asserted here if appropriate. Further, the NOWS* line is latched for branching information to the next state. Additionally in state 218, if the remaining byte count is 0, as indicated by the byte counter state machine, and the NOWS* signal is low, then either the MEM32* or IO32* signal, as appropriate, is made low to indicate to the master unit that the completion of a 32 bit cycle is beginning.

Control can exit state 218 to 4 possible alternate states based on the value of the remaining bytes to be read as indicated by the byte counter state machine, based on the state of the latched NOWS* signal and based on the state of the latched M16* or IO16* signals appropriately. If this is the last byte to be read as indicated by the count value equalling 00 and if the data will be available in the near course as indicated by the NOWS* signal being low, control transfers to state 220 where the RDY32 signal is raised to indicate to the master unit that the cycle is completing. Additionally at state 220, if this is a read operation, the data which is available from the responding device on the 8 and/or 16 bit connectors 8 and 16 is latched and routed as indicated by the byte counter state machine value, the BE*<3-0> lines, and M16* or IO16 lines. Finally in state 220, the MRDC*, SMRDC*, MWTC*, SMWTC*, IORC*, or IOWC* line is made high, as appropriate, to indicate to the ISA device that its cycle is completed.

Control then proceeds to state 222 where the system board enables the data onto the 32 bit data lines if a 32 bit read operation was requested by the master unit or floats the data lines if a 32 bit write operation was requested by the master unit. Further, the MEM32* signal or IO32* signal is raised for a smooth flow to the next operation. Control then proceeds to state 224 where the data lines are floated if this was a read operation, in preparation for a smooth handoff of the data lines to the master unit. Control then proceeds from state 224 to state 204 if the master unit is still going to be in control and to state 200 if the master unit is relinquishing control and a new device is taking over bus control or if the START* and CMD* signals are both high, also indicating that a master unit is relinquishing control or indicating that back to back I/O operations are occurring.

If after state 218, the latched NOWS* signal is high and the latched M16* or IO16* signal is low indicating that a normal 16 bit cycle will be performed, control proceeds to state 226 where a CHRDY latch is cleared and then to state 228. In state 228, if the remaining number of bytes is 0 as indicated by the byte counter state machine, then the MEM32* signal or the IO32* signal is lowered to indicate to the master unit that a cycle is nearing completion. Additionally at state 228, the CHRDY line state is latched for use in branching. If the latched CHRDY value is low, control proceeds to state 226 because this is a wait loop operation, as the 16 bit device cannot respond in time. If the remaining number of bytes to be read is 0 and the 16 bit device can respond in normal sequence as indicated by the latched CHRDY signal being high, then control proceeds to state 220 for completion of the cycle. If however, there are more bytes to be read and the data is available for this device, then control proceeds to state 230 where the data is latched if this is a read operation and the appropriate ISA standard memory or I/O space read or write signal is raised to indicate completion of the cycle to the ISA device.

Control proceeds from state 230 to state 232 where the BALE line is raised to indicate to the various devices that a new address is being presented on the SA lines. If this is a write operation which is being performed, the new data s presented on the appropriate data lines. Control then returns from state 232 to state 212 for continuation of the operation of the system board state machine.

If the count value was not equal to 0 after the advancing of the byte count state machine in state 218 and the latched NOWS* signal- was low, control proceeds to state 230 because the data is available and then proceeds from state 230 as previously described.

The final exit from state 218 is to state 234 and this path is taken if the M16* or IO16* signal is high indicating that an 8 bit device will be responding and the latched NOWS* signal is high, indicating that the data is not present at this time. In state 234 if the byte count is 0, indicating that this is the last byte to be read, then the MEM32* or IO32* signal, as appropriate, is lowered to indicate to the master unit that the cycle is completing. There are three exits from state 234. If just prior to the next edge of the BCLK signal, the byte count is equal to 0 and the NOWS* signal is low, indicating that the data is present, then control proceeds to 220, while if the NOWS* signal is low and the count is not equal to 0, control proceeds to state 230.

If things are proceeding on a conventional path, the NOWS* signal will be high before the BCLK signal edge and control will proceed to state 236 and to state 238, which has similar exits to states 220 and 230 under similar conditions as state 234. If the NOWS* signal is still high at the next edge of the BCLK signal, control proceeds to state 240 and to state 242. Once again, exits are available to states 220 and 230 under similar conditions as states 234 and 238. If the data is still not available as indicated by the NOWS* signal still being high at the next edge of the BCLK signal, control proceeds to state 244 and then to state 246. This would normally be the last state in an 8 bit access as defined in the original IBM PC standard, but it is understood that the appropriate device may not still be ready so there are two exits from state 246. If the CHRDY signal is asserted low prior to the falling edge of the BCLK signal, control returns to state 244 to enter a wait state loop until the CHRDY signal is high prior to the falling edge of the BCLK signal. If the CHRDY signal is high, then control proceeds from state 246 to state 248. Control proceeds from state 248 to state 220 if this is the last byte which was read, or to state 230 if there are further bytes to read as indicated by the byte counter value.

Therefore, all branches of the system board state machine have been taken and as can be seen this is a relatively complex state machine, so that there is indeed a great savings if the two state machines and the latches, buffers and circuitry necessary for data routing are provided on the system board, particularly if it is integrated into a gate array or other custom device specifically designed for operation with this interface standard.

Returning now to cycles A and B as shown in FIG. 2, at time 402 the master unit state machine is at state 100 and the system board state machine is at state 200. The master unit asserts the address on the LA<31-2> lines and the M-IO signal has a high state on the M-IO line. At time 404 the master unit state machine proceeds to state 102 while the system board state machine proceeds to state 202. The master unit lowers the START* signal, makes sure the CMD* signal is high and asserts the BE*<3-0> signals and W-R signal. Proceeding to time 406, the next edge of the BCLK signal, the master unit state machine proceeds to state 104 and the system board state machine proceeds to state 204. The system board raises the BALE signal and transfers the LA<19-2> lines to the SA<19-2> lines and converts the BE*<3-0> signals to the proper starting address value and presents this value on the SA<1-0> lines, in this case a value of 00.

At the next BCLK signal edge at time 412, the master unit state machine proceeds to state 106 and the system board state machine proceeds to state 212. The system board state machine proceeded to state 212 because the MEM32* signal was high. At this time, the master unit raises the START* signal and lowers the CMD* signal. The system board lowers the RDY32 signal and the BALE signal, latches the M16* signal, latches the SA lines and latches the SA<1-0> values into the address counter. The system board also lowers the MRDC* line because the M16* signal is low.

Advancing now to time 414, the master unit state machine proceeds to state 108 because the RDY32 signal is low and the system board state machine proceeds to state 218 where the byte counter state machine is advanced to state 302 with a value of 10 and the NOWS* signal state is latched. At the next edge of the BCLK signal, the rising edge at time 416, the master unit state machine proceeds to state 110 and the system board state machine proceeds to state 230 because the byte count is not equal to zero and the latched NOWS* signal is low. The system board latches the data presented on the data lines D<15-8> and D<7-0> into latches 600 and 602 which will present the data to the same data lines when appropriate. The system board also raises the SMRDC* and MRDC* signals to signal the end of the first ISA standard read operation.

Advancing to time 418, the master unit state machine loops back to state 108 because the RDY32 signal is low and the system board state machine proceeds to state 232, where the BALE signal is raised.

At the next edge of the BCLK signal at time 420 the master unit state machine proceeds to state 110 and the system board state machine returns to state 212. At state 212, the system board lowers the BALE signal, the MRDC* signal and the SMRDC* signal and latches the M16* signal state, and the SA<1-0> address values are latched.

At the next falling edge of the BCLK signal, which occurs at time 422, the master unit state machine loops back to state 108 and the system board state machine proceeds to state 218. The system board advances the byte counter state machine to state 306, the zero count state. A value of two is added to the address value for possible later presentation to the SA<1-0> lines if necessary. It is noted that the values of the upper bits of the SA lines, namely SA<19-2>, did not change during this entire cycle. Additionally at state 218, the system board latches the NOWS* signal state, which is low. Also while at state 218 in this pass, the system board lowers the MEM32* signal because the byte count is now zero.

At time 424 the master unit state machine proceeds for the last time this cycle to state 110 and the system board state machine proceeds to state 220 because the byte count is zero and the latched NOWS* signal state is low. At state 220 the system board raises the RDY32 signal, indicating to the master unit that the device is ready, raises the SMRDC* and MRDC* signals and latches the data presented on the D<15-8> and D<7-0> lines into latches 604 and 606. The data is stored in latches 604 and 606 because this ISA standard read operation was the high word of a double-word read.

At the next edge of the BCLK signal, time 426, the master unit state machine proceeds to state 116 and the system board state machine proceeds to state 222. This time is the beginning of cycle B, so the master unit asserts the next address on the LA<31-2> lines and the working space on the M-IO line. The system board raises the MEM32* signal and presents the latched data to the D<31-0> lines for use by the master unit.

At time 428 the master unit state machine proceeds to state 118 and the system board state machine proceeds to state 224. The master unit sets the BE*<3-0> and W-R signals as needed, sets the CMD* signal high and sets the START* signal low to indicate the end of cycle A and the beginning of cycle B. Additionally, the master unit stores the data on the data lines to complete the read operation. The system board floats its outputs to the data lines to allow the master unit to drive them if necessary.

Cycle B proceeds at time 430, with the master unit state machine proceeding to state 104 and the system board state machine returning to state 204 because the master request is still pending, indicating that the master unit is not relinquishing control of the bus. At state 204 the system board raises the BALE signal and asserts the proper address on the SA<19-0> lines.

Proceeding to the next BCLK signal edge at time 432, the master unit state machine advances to state 106 and the system board state machine advances to state 206. The system board state machine proceeds to state 206 because the MEM32* signal is low, indicating that a 32 bit standard device will be responding. At state 206 the system board lowers the BALE signal. At state 106 the master unit raises the START* signal and lowers the CMD* signal.

At time 434 the master unit state machine proceeds to state 116 and the system unit state machine proceeds to state 208. State 116 is entered because the RDY32 signal was high and the master unit was not done. The master unit asserts the next address onto the LA<31-2> lines and the next M-IO state onto the M-IO line. This is the address pipeline for the next cycle.

Proceeding to time 436, the master unit state machine proceeds to state 118 and the system board state machine proceeds to state 210. The master unit stores the data from the D<31-0> lines, raises the CMD* signal, lowers the START* signal and sets the BE*<3-0> and W·R signals as desired. The system board does nothing, but will proceed to state 204 on the next BCLK signal edge because the START* signal is low, indicating that the next cycle is in process.

This has been an explanation of several cycles of operation of the state machines. Further examples can be developed from the various state machines in combination with the timing diagrams.

The foregoing disclosure and description of the invention are illustrative and explanatory thereof, and various changes in the size, shape, materials, components, circuit elements, wiring connections and contacts, as well as in the details of the illustrated circuitry, construction and method of operation may be made without departing from the spirit of the invention.

I claim:

1. A system for transferring information of first and second different widths between a master unit of a first information width which provides a first set of address values, provides a first set of address control signals for use with the first information width and responds to a first delay signal to hold providing certain of said first set of address control signals and a responding unit of the first information width or a responding unit of a second information width, a responding unit of the first information width providing a first address response signal when addressed using the first set of address control signals to indicate a response will be received from the first information width responding unit and a responding unit of the second information width using a second set of address control signals and not providing the first address response signal, the system comprising:
   an information path of a first width for coupling to the master unit and a responding unit of the first information width;
   an information path of a second width for coupling to the master unit and a responding unit of the second information width;
   an address value path for coupling to the master unit and responding units of the first and second information widths;
   a first address control signal path for coupling to the master unit and a responding unit of the first information width;
   means coupled to said first address control signal path for determining whether a response will be received from a responding unit which utilizes said first set of address control signals by monitoring the state of the first address response signal;
   a second address control signal path for coupling to the master unit and a responding unit of the second information width;
   means coupled to said first and second address control signal paths for providing the second set of address control signals for use with responding units of other than the first information width and for providing the first delay signal in response to said first address control signal set response determining means determining that a response will not be received from a responding unit utilizing said first set of address control signals; and
   means coupled to said first and second width information paths and said second address control signal set providing means for routing and storing information for transfer between said first width information path and said second width information path when said second address control signals are being provided.

2. The system of claim 1, wherein responding units may additionally be of a third information width using the second set of address control signals, a responding unit of the second information width providing a second address response signal when addressed using the second set of address control signals to indicate a response will be received from the second information width responding unit and further comprising:
   an information path of a third width for coupling to the master unit and a responding unit of the third information width;
   means coupled to said second address control signal path for determining whether a response will be received over said second width information path from a responding unit of the second information width which utilizes said second set of address control signals by monitoring the state of the second address response signal; and
   means coupled to said first and third width information paths, said second address control signal set providing means and said second information width response determining means for routing and storing information for transfer between said first width information path and said third width information path when said second address control signals are being provided and a second information width responding unit will not be responding.

3. The system of claim 2, wherein said first width information path includes said second width information path and said second width information path includes said third width information path.

4. The system of claim 1, further comprising:
   means coupled to said address value path and said second address control signal set providing means for providing a second set of address values for use by a responding unit utilizing said second set of address control signals when said second address control signals are being provided.

5. The system of claim 4, wherein responding units may additionally be of a third information width using the second set of address control signals, a responding unit of the second information width providing a second address response signal when addressed using the second set of address control signals to indicate a response will be received from the second information width responding unit and further comprising:
   an information path of a third width for coupling to the master unit and a responding unit of the third information width;
   means coupled to said second address control signal path for determining whether a response will be received over said second width information path from a responding unit of the second information width which utilizes said second set of address control signals by monitoring the state of the second address response signal; and
   means coupled to said first and third width information paths, said second address control signal set providing means and said second information width response determining means for routing and storing information for transfer between said first width information path and said third width information path when said second address control signals are being provided and a second information width responding unit will not be responding.

6. The system of claim 6, wherein said means for providing said second set of address values includes means for changing said address values in response to said second information width response determining means determining whether a response will be received over said second width information path.

7. The system of claim 1, wherein said first width information path includes said second width information path.

8. The system of claim 1, wherein said second set of address control signals providing means includes means for determining if all the required information has been transferred and for repeating said second set of address control signals as necessary to transfer all the information.

9. The system of claim 8, wherein said means for providing said second set of address values includes means for changing said address values in response to said second set determining means determining whether a response will be received over said second width information path.

10. A computer system for use with master unit circuit boards and responding circuit boards of a first information width or a second information width, a responding circuit of the first information width providing a first address response signal when addressed using a first set of address control signals to indicate a response will be received from the first information width responding unit, the computer system comprising:
- a system board including address control and information routing and storing circuitry and a plurality of connector sets for receiving the circuit boards, each of said connector sets including lines for transferring information of a first width and a second width and for transferring address values and address control signals.
- wherein the master unit circuit boards include:
- means for providing a first set of address values to said address value lines;
- means for providing said first set of address control signals for use with the first information width to said address control signal lines and responsive to a first delay signal to hold providing certain of said first set of address control signals,
- means for transferring information on said first width information lines, and
- wherein said system board address control and information routing and storing circuitry includes:
- means for determining whether a response will be received from a responding circuit board which utilizes said first set of address control signals by monitoring the state of the first address response signal,
- means for providing a second set of address control signals to said address control signal lines for use with responding circuit boards of other than the first information width and for providing the first delay signal to simulate a delay request in response to said first address control signal set response determining means determining that a response will not be received from a responding circuit board utilizing said first set of address control signals, and
- means for routing and storing information for transfer between said first width information lines and said second width information lines.

11. The computer system of claim 10, wherein each of said connector sets includes lines for transferring information of a third width; wherein the responding circuit boards may additionally be of the third information width; wherein a responding circuit board of the second information width provides a second address response signal when addressed using the second set of address control signals to indicate a response will be received from the second information width responding unit; and wherein said system board address control and information routing circuitry further includes:
- means for determining whether a response will be received over said second width information lines from a responding circuit board which utilizes said second set of address control signals by monitoring the state of the second address response signal, and
- means for routing and storing information for transfer between said first width information lines and said third width information lines.

12. The computer system of claim 11, wherein said first width information lines include said second width information lines and said second width information lines include said third width information lines.

13. The computer system of claim 10, wherein said system board address control and information routing circuitry further includes means for providing a second set of address values to said address value lines for use by responding circuit boards utilizing said second set of address control signals.

14. The computer system of claim 13, wherein each of said connector sets includes lines for transferring information of a third width; wherein the responding circuit boards may additionally be of the third information width; wherein a responding circuit board of the second information width provides a second address response signal when addressed using the second set of address control signals to indicate a response will be received from the second information width responding unit; and from wherein said system board address control and information routing circuitry further includes:
- means for determining whether a response will be received over said second width information lines from a responding circuit board which utilizes said second set of address control signals by monitoring the state of the second address response signal, and
- means for routing and storing information for transfer between said first width information lines and said third width information lines.

15. The computer system of claim 14, wherein said means for providing said second set of address values includes means for changing said address values in response to said second set of determining means determining whether a response will be received over said second width information lines.

16. The computer system of claim 10, wherein said first width information lines include said second width information lines.

17. The computer system of claim 10, wherein said second set of address control signals providing means includes means for determining if all the required information has been transferred and for repeating said second set of address control signals as necessary to transfer all the information.

18. The computer system of claim 17, wherein said means for providing said second set of address values includes means for changing said address values in response to said second set determining means determining whether a response will be received over said second width information path.

* * * * *

UNITED STATES PATENT AND TRADEMARK OFFICE
CERTIFICATE OF CORRECTION

PATENT NO.  : 5,109,332
DATED       : April 28, 1992
INVENTOR(S) : Paul R. Culley It is certified that error appears in the above-identified patent and that said Letters Patent is hereby corrected as shown below:

In Col. 29, line 1, change "of claim 6" to -- of claim 5 --.

In Col. 29, line 36, change "signals." to -- signals; --.

Signed and Sealed this

Twenty-eighth Day of September, 1993

Attest:

BRUCE LEHMAN

*Attesting Officer*       *Commissioner of Patents and Trademarks*